United States Patent
Aoki et al.

(10) Patent No.: US 7,971,083 B2
(45) Date of Patent: *Jun. 28, 2011

(54) OUTPUT SYSTEM, PRINTING SYSTEM, PRINTING DEVICE MANAGEMENT DEVICE AND PRINTING DEVICE, PRINT INSTRUCTION PROGRAM, PRINTING DEVICE MANAGEMENT PROGRAM AND PRINTING DEVICE CONTROL PROGRAM, AND PRINTING METHOD

(75) Inventors: Mikio Aoki, Suwa (JP); Yusuke Takahashi, Suwa (JP)

(73) Assignee: Seiko Epson Corporation (JP)

( * ) Notice: Subject to any disclaimer, the term of this patent is extended or adjusted under 35 U.S.C. 154(b) by 526 days.

This patent is subject to a terminal disclaimer.

(21) Appl. No.: 12/130,133

(22) Filed: May 30, 2008

(65) Prior Publication Data

US 2008/0232887 A1 Sep. 25, 2008

Related U.S. Application Data

(62) Division of application No. 11/297,718, filed on Dec. 8, 2005, now Pat. No. 7,398,405.

(30) Foreign Application Priority Data

May 25, 2005 (JP) ................................. 2005-151894
Sep. 8, 2005 (JP) ................................. 2005-260681

(51) Int. Cl.
*G06F 1/32* (2006.01)
(52) U.S. Cl. ........ 713/320; 713/300; 713/310; 713/323; 358/1.14; 358/1.15; 358/421; 399/37; 399/88; 399/89

(58) Field of Classification Search .................. 713/300, 713/320, 323
See application file for complete search history.

(56) References Cited

U.S. PATENT DOCUMENTS

| | | | |
|---|---|---|---|
| 5,528,346 A | 6/1996 | Kim et al. | |
| 5,589,923 A | 12/1996 | Lee et al. | |
| 5,708,821 A | 1/1998 | Takikita | |
| 6,226,472 B1 | 5/2001 | Yun | |
| 2002/0054316 A1 | 5/2002 | Abe | |
| 2003/0107761 A1 | 6/2003 | Kimura | |

FOREIGN PATENT DOCUMENTS

| | | |
|---|---|---|
| CN | 1121595 | 5/1996 |
| EP | 0 858 021 | 8/1998 |
| EP | 1 107 104 | 6/2001 |
| JP | 06-103008 | 4/1994 |
| JP | 2000-298271 | 10/2000 |
| JP | 2004-272596 | 9/2004 |
| JP | 2004-362432 | 12/2004 |

*Primary Examiner* — Nitin C Patel
(74) *Attorney, Agent, or Firm* — Harness, Dickey & Pierce, P.L.C.

(57) ABSTRACT

An output system having an output device that performs output based on output data so that the output device performs the output after having acquired authentication. In the system, an operating state controlling unit outputs a power-save-cancel command for causing a power-saving state to be changed into an active state to a power-save switching unit after a device having an output data storing unit acquires the output data, and a transition-to-power-save command for causing the state to be changed from the active state to the power-saving state is outputted to the power-save switching unit when the output process of the output data is completed by an output process completion detecting unit.

9 Claims, 14 Drawing Sheets

| 402 | USER ID | takahashi |
|---|---|---|
| 404 | NAME OF DOCUMENT DATA | minute.doc |
| 406 | TERMINAL INFORMATION | 192.168.0.93 |
| 408 | DATA AND TIME OF PRINTING | 2004.01.05 14:30:06 |
| 410 | PRINT SETTING | (NOT SHOWN) |

| JOB ID 422 | USER INFORMATION 424 | NAME OF DOCUMENT DATA 426 | OPERATION TERM OF VALIDITY INFORMATION 428 | SET TIME INFORMATION 430 | NUMBER OF TIME OF PRINTING 432 | OTHER INFORMATION 434 |
|---|---|---|---|---|---|---|
| 1 | takahashi | 0001.prn | NULL | NULL | 0 | ... |
| 2 | sato | 0002.prn | 3221817 | 10 MINUTES | 0 | ... |
| 3 | takahashi | 0003.prn | NULL | NULL | 1 | ... |

| JOB ID 422 | USER INFORMATION 424 | NAME OF DOCUMENT DATA 426 | OPERATION TERM OF VALIDITY INFORMATION 428 | SET TIME INFORMATION 430 | NUMBER OF TIME OF PRINTING 432 | OTHER INFORMATION 434 |
|---|---|---|---|---|---|---|
| 1 | takahashi | 0001.prn | NULL | NULL | 0 | ... |
| 2 | sato | 0002.prn | 3221839 | 10 MINUTES | 0 | ... |
| 4 | tanaka | 0004.prn | 3221851 | 30 MINUTES → 10 MINUTES | 0 | ... |
| 6 | aoki | 0006.prn | 3221855 | 30 MINUTES → 10 MINUTES | 0 | ... |
| 3 | takahashi | 0003.prn | NULL | NULL | 1 | ... |
| 5 | aoki | 0005.prn | NULL | NULL | 3 | ... |

OUTPUT SYSTEM, PRINTING SYSTEM, PRINTING DEVICE MANAGEMENT DEVICE AND PRINTING DEVICE, PRINT INSTRUCTION PROGRAM, PRINTING DEVICE MANAGEMENT PROGRAM AND PRINTING DEVICE CONTROL PROGRAM, AND PRINTING METHOD

CROSS REFERENCE TO RELATED APPLICATIONS

This application is a divisional of U.S. Ser. No. 11/297,718 filed Dec. 18, 2005 claiming priority to Japanese Patent Application Nos. 2005-151894 filed May 25, 2005 and 2005-260681 filed Sep. 8, 2005 which are hereby expressly incorporated by reference herein in their entireties.

BACKGROUND

1. Technical Field

The present invention relates to a system, a device, a program and a method for executing an output process by an output device having a power saving mode and, more specifically, to an output system, a printing system, a printing device management device, a printing device and a printing device management program, a printing device control program, and a printing method which are preferable for achieving both quick starting of the output process (such as printing) and power savings in an authentication output system.

2. Related Art

As a printing system provided with a security function, for example, an authentication printing system in which a user authentication device is provided in the vicinity of a network printer, so that the network printer starts printing when the user transmits a printing job from a host terminal to the user authentication device and then swipes an authentication card through the user authentication device.

In the authentication printing system in the related art, if the network printer is in the power-saving state, the network printer is kept in the power-saving state until the printing job is handed to an interpreter of the network printer. In such a case, the start of the printing process is delayed by the time (a duration) required for the warming-up process, and hence the user is obliged to wait for the printing process. On the other hand, in order to keep the warmed up state for starting the printing process quickly, consumption of a certain amount of power is necessary, which causes economical/environmental burden.

JP-A-2004-272596 discloses a technology to start the printing process quickly by a network printer having a power saving mode. The invention of JP-A-2004-272596 is the technology in which a warm up command is issued to the network printer registered in advance when a remote output button provided on a print set operation panel, whereby the network printer is warmed up.

However, when the invention disclosed in JP-A-2004-272596 is applied to the authentication printing system, the following problems arise.

Since the user authentication device is adapted to retain a printing job in the authentication printing system, there may be a case in which printing is not started immediately after the printing job is transmitted from the host terminal by the user, and the user authentication is performed after a while and then the printing process is executed. Therefore, even when the network printer is warmed up while the print set operation panel is operated on the host terminal as in the case of the invention disclosed in JP-A-2004-272596, power is wasted as long as it takes time from the transmission of the printing job until the user authentication is performed.

Information processing equipment and consumer electronics are recently configured in such a manner that power consumption is reduced by automatically halting functions of equipment when the equipment is not used for a certain period from the completion of usage of the equipment based on environmental standards such as the international energy program (ENERGY STAR).

However, when the network printer used for the authentication printing system is configured so that the warmed up state is maintained for a certain period after completing the printing process as described above, a state in which printing can be started immediately is maintained even though it is clear that the printing output will not be made. Therefore, power is consumed correspondingly, which causes economical/environmental burden.

Such a problem is assumed to occur not only when printing is performed by the network printer, but also when a display output device such as a projector or an LCD (Liquid Crystal Display) is connected to the network for achieving display on the display output device.

SUMMARY

Accordingly, in view of such unsolved problems suffered in the related art, an advantage of some aspects of the invention is to provide an output system, a printing system, a printing device management device and a printing device, a print instruction program, and a printing device management program and a printing device control program, and a printing method which are preferable for achieving both quick starting of an output process and power savings in an authentication output system.

Mode 1

In order to achieve the above-described object, an output system in Mode 1 is an output system having an output device that performs output on the basis of output data so that the output device performs the output after having acquired authentication including:

output data acquiring unit for acquiring the output data; output data storing unit for storing the output data acquired by the output data acquiring unit in output data memory unit; authentication information acquiring unit for acquiring authentication information; usage-qualification determining unit for determining a usage qualification of the output data on the basis of the authentication information acquired by the authentication information acquiring unit; operating state controlling unit for controlling a state of the output device; output process completion detecting unit for detecting completion of an output process in the output device; and power-save switching unit for switching a state of the output device into either one of an active state in which the output process to be performed by an output processing unit is enabled and a power-saving state in which a drive power during a stand-by time for the output process on the basis of either one of a command from the operating state controlling unit and an elapsed time from a switching time which corresponds to a stand-by time for the active state until the state of the output device is switched from the active state to the power-saving state (this switching operation is performed, for example, automatically), wherein the operating state controlling unit outputs a power-save-cancel command for causing the power-saving state to be changed into the active state to the power-save switching unit after the device having the output data storing unit acquires the output data, and a transition-to-power-save command for causing the state to be changed from the active state to the power-saving state is outputted to the power-save switching unit when the output process of the output data is completed is detected by the output process completion detecting unit.

In this arrangement, when the output data is acquired by the output data acquiring unit, in the device having the output data storing unit, the output data storing unit stores the acquired output data in the output data memory unit.

The operating state controlling unit issues a power-save-cancel command for causing the state of the output device from the power-saving state to the active state to the power-save switching unit after the device having the output data storing unit acquires the output data, and issues the transition-to-power-save command for causing the state from the active state to the power-saving state to the power-save switching unit when the output process of the output data is completed is detected by the output process completion detecting unit.

When the power-save-cancel command is entered into the power-save switching unit, if the current state of the output device is the power-saving state, the current state is changed from the power-saving state to the active state by the power-save switching unit. When the transition-to-power-save command is entered into the power-save switching unit, if the current state of the output device is the active state, the current state is changed from the active state to the power-saving-state by the power-save switching unit.

When the authentication information is acquired by the authentication information acquiring unit, the usage qualification of the output data is determined by the usage-qualification determining unit on the basis of the acquired authentication information.

When the output device is in the active state, the output process is performed on the basis of the output data which is determined to have the usage qualification by the usage-qualification determining unit out of the output data stored in the output data memory unit.

Therefore, since the output process of the power-save-cancel command is executed after the device having the output data storing unit acquires the output data, when the state of the output device is the power-saving state, the state is changed to the active state, and when the output process of the output data is completed, the state is changed from the active state to the power-saving state without taking much time. Therefore, once authenticated, the user can cause the output device to start the output process without the stand-by time for changing from the power-saving state to the active state or less stand-by time in comparison with the normal state, and can cause the output device to maintain the active state only for a period required for completing the output and then save the power in the power-saving state in other states.

In this specification, the above-descried "authentication information" represents information for determining validity of the user such as user identification information or password information.

The above-described "usage-qualification determination process (authentication process)" is preferably started immediately after the authentication information is acquired by the authentication information acquiring unit.

The above-described "operating state controlling unit" outputs the power-save-cancel command or the transition-to-power-save command to the power-save switching unit to perform a process of switching the state between the active state in which the output process is immediately executed and the power-saving state in which the drive power of the output device is reduced as a controlling process of the state of the output device.

The above-described "operating state controlling unit" determines that the device provided with the output data storing unit acquires the output data, for example, on the basis of an event that is notified by the output data storing unit at the stage of acquisition of the output data.

The above-described "output process completion detecting unit" determines the termination of the output process, for example, by giving inquiries to an output data management function provided in the output device. The output process management function is a known function in the output device such as general printing devices, LCDs, and projectors.

The above-described "power-save-cancel command" may have a role to clear a measured value of a timer or the like that measures the elapsed time of the active state when the output device is in the active state in addition to the role of switching the state of the output device from the power-saving state to the active state.

The above-described "after . . . acquires" may be after reception of the output data, for example, at any time before or after storing the output data into the output data memory unit. However, considering delay in the network or the like, it is preferable to perform the acquisition process for the respective information and the output process for the respective commands at a timing as early as possible.

This system may be configured to realize the output device as a network system that is connected to other devices, terminals, equipment, and so on so as to be capable of mutual communication. In this case, the output data memory unit, the output data storing unit, the authentication information acquiring unit, the usage-qualification determining unit, the operating state controlling unit, and the output process completion detecting unit may belong to any one of the output device and other equipment.

Mode 2

In order to achieve the above-described object, an output system in Mode 2 is an output system having an output device that performs output on the basis of output data so that the output device performs the output after having acquired authentication comprising;

output data acquiring unit for acquiring the output data; output data storing unit for storing the output data acquired by the output data acquiring unit in output data memory unit; authentication information acquiring unit for acquiring authentication information; usage-qualification determining unit for determining a usage qualification of the output data on the basis of the authentication information acquired by the authentication information acquiring unit; operating state controlling unit for controlling a state of the output device; and output process completion detecting unit for detecting completion of the output process in the output device, wherein the output device includes output processing unit for executing an output process on the basis of the output data that is determined to have a usage qualification by the usage-qualification determining unit out of the output data stored in the output data memory unit, and power-save switching unit for switching a state of the output device into either one of an active state in which the output process to be performed by the output processing unit is enabled and a power-saving state in which a drive power during a stand-by time for the output process on the basis of either one of a command from the operating state controlling unit and an elapsed time from a switching time which corresponds to a stand-by time for the active state until the state of the output device is switched from the active state to the power-saving state, and wherein the operating state controlling unit outputs a power-save-cancel command for causing the power-saving state to be changed into the active state to the power-save switching unit after the device having the output data storing unit acquires the output data, and a transition-to-power-save command for causing the state to be changed from the active state to the power-saving state is outputted to the power-save switching unit when the output process of the output data is completed is detected by the output process completion detecting unit.

In this arrangement, when the output data is acquired by the output data acquiring unit, in the device having the output data storing unit, the output data storing unit stores the acquired output data in the output data memory unit.

The operating state controlling unit outputs a power-save-cancel command for causing the state of the output device from the power-saving state to the active state to the power-save switching unit after the device having the output data storing unit acquires the output data, and outputs the transition-to-power-save command for causing the state from the active state to the power-saving state to the power-save switching unit.

When the power-save-cancel command is entered into the power-save switching unit, is the current state of the output device is the power-saving state, the current state is changed from the power-saving state to the active state by the power-save switching unit. When the transition-to-power-save command is entered into the power-save switching unit, if the current state of the output device is the active state, the current state is changed from the active state to the power-saving-state by the power-save switching unit.

When the authentication information is acquired by the authentication information acquiring unit, the usage qualification of the output data is determined by the usage-qualification determining unit based on the acquired authentication information.

When the output device is in the active state, the output process is performed on the basis of the output data which is determined to have the usage qualification by the usage-qualification determining unit out of the output data stored in the output data memory unit by the output processing unit.

Therefore, since the output process of the power-save-cancel command is executed after the device having the output data storing unit acquires the output data, when the state of the output device is the power-saving state, the state is changed to the active state, and when the output process of the output data is completed, the state is changed from the active state to the power-saving state without taking much time. Therefore, once authenticated, the user can cause the output device to start the output process without the stand-by time for causing the power-saving state to be changed into the active state or less stand-by time in comparison with the normal state, and can cause the output device to maintain the active state only for a period required for completing the output and then save the power in the power-saving state in other states.

In this specification, the above-described "output processing unit" may be any structure as long as the output is performed on the basis of the output data, and includes, for example, printing unit for performing printing on the basis of printing data, display unit for performing display on the basis of display data, or sound output unit for outputting sound on the basis of sound data. The display unit corresponds, for example, to a projector or an LCD.

Mode 3

The output system in Mode 3 is, in the output system in Mode 1 or 2, wherein an output instruction issuing device that gives instruction to output the output data is connected to the device having the output data storing unit so as to be capable of communicating data, the output instruction issuing device includes output instruction issuing unit for transmitting the output data to a device having the output data storing unit corresponding to the destination output device of the output data; and switching-time-change instruction issuing unit for issuing instruction to change the switching time which is preset in the output device;

the output device includes switching time changing unit for changing the switching time which is preset in the output device on the basis of a switching-time-change command from the operating state controlling unit, the operating state controlling unit is adapted to output the switching-time-change command to the switching time changing unit according to the instruction from the switching-time-change instruction issuing unit, and to output the switching-time-change command for restoring the switching time which is currently set in the destination output device into the switching time before being changed when a printing process completion detecting unit detects that the output process of the output data corresponding to the output device whose switching time is changed is completed, or when the switching time after the change is elapsed.

In this arrangement, in the output instruction issuing device, the output data is transmitted to the device having the output data storing unit corresponding to the destination output device of the output data by the output instruction issuing unit, and the switching-time-change instruction which is preset in the output device is executed by the switching-time-change instruction issuing unit.

On the other hand, when the switching-time-change instruction is issued, the operating state controlling unit outputs the switching-time-change command to the switching time changing unit. In addition, the output process completion detecting unit outputs the switching-time-change command for restoring the switching time which is currently set in the destination output device into the switching time before being changed when the output process completion detecting unit detects that the output process of the output data corresponding to the output device whose switching time is changed is completed, or when the switching time after the change is elapsed is detected.

Therefore, the user can change the switching time preset in the output device into the desired switching time, for example, by giving an instruction of the user-desired switching time via the switching-time-change instruction issuing unit. Accordingly, for example, by elongating the switching time to a length longer the normal length, the active state continues by the length corresponding to the elongated amount. Consequently, even when acquisition of the authentication is delayed correspondingly, the output device is caused to execute the output process immediately before being changed into the power-saving state. In contrast, by shortening the switching time to a length shorter than normal, the amount of power consumption of the output device can be reduced correspondingly.

Since it is adapted to restore the changed switching time into the switching time before being changed when the output process of the output data stored in the output data memory unit is completed or the switching time is elapsed when the switching time is changed, meaningless increase in power consumption by being set to the switching time longer than original switching time continuously or deterioration of convenience of the output device by being set to the switching time shorter than original switching time continuously can be prevented.

The above-described "output data storing unit corresponding to the destination output device" represents the output data storing unit for storing the output data outputted from the output device.

Mode 4

The output system in Mode 4 is, in the output device according to any one of Mode 1 to Mode 3, wherein an output device management device for managing the output device is connected to the output device so as to be capable of data communication, the output device management device includes the output data acquiring unit; the output data storing unit; the authentication information acquiring unit; the usage-qualification determining unit; the operating state controlling unit; the output process completion detecting unit; and output data transmitting unit for transmitting the output data that is determined to have the usage qualification by the usage-qualification determining unit out of the output data stored in the output data memory unit, the output device includes an output data receiving unit for receiving the output data and the output processing unit executes the output process on the basis of the output data received by the output data receiving unit.

In this arrangement, in the output device management device, when the output data is acquired by the output data acquiring unit, the output data storing unit stores the acquired output data in the output data memory unit. When the power-save-cancel command for causing the operating state controlling unit to change the state of the output device from the power-saving state to the active state after having acquired the output data is issued to the power-save switching unit, and the output process completion detecting unit detects that the output process of the output data is completed, the transition-to-power-save command for causing the state to be changed from the active state to the power-saving state is issued to the power-save switching unit. When the authentication information acquiring unit acquires the authentication information, the usage-qualification determining unit determines the usage qualification of the output data stored in the output data memory unit on the basis of the acquired authentication information. When it is determined to have the usage qualification consequently, the output data transmitting unit transmits the output data having the usage qualification to the output device.

On the other hand, in the output device, when the output data receiving unit receives the output data from the output device management device in the active state, the output processing unit performs the output process on the basis of the received output data.

Therefore, in the output device management device, the state of the output device can be controlled, and hence the state of a plurality of the output device can advantageously be controlled together by a single output device management device without providing a function for controlling the state of the output device to the respective output devices.

Mode 5

The output system in Mode 5 is, in the output system according to any one of Modes 1 to 3, wherein the output device includes the output data acquiring unit; the output data storing unit; the authentication information acquiring unit; the usage-qualification determining unit; the operating state controlling unit; and the output process completion detecting unit.

In this arrangement, when the output data is acquired by the output data acquiring unit, the output data storing unit stores the acquired output data in the output data memory unit. When the power-save-cancel command for causing the operating state controlling unit to change the state of the output device from the power-saving state to the active state after having acquired the output data is issued to the power-save switching unit, and the output process completion detecting unit detects that the output process of the output data is completed, the transition-to-power-save command for causing the state to be changed from the active state to the power-saving state is issued to the power-save switching unit. When the authentication information acquiring unit acquires the authentication information, the usage-qualification determining unit determines the usage qualification of the output data stored in the output data memory unit on the basis of the acquired authentication information.

Therefore, since the output device has the function to control the state of the output device by itself, the output device can advantageously bring out the power-saving function by itself without providing other devices having a function to control the state of the output device, such as the output device management device.

Mode 6

In addition to the output system according to any one of Modes 3 to 5, the output system in Mode 6 further includes; set time information acquiring unit for acquiring the set time information as the information on the switching time preset in the destination output device of the output data after the device having the output data storing unit acquires the output data; term-of-validity calculating unit for acquiring the time information after the device having the output data storing unit acquires the output data and calculating the term of validity of the active state for the output data on the basis of the acquired time information and the set time information acquired by the set time information acquiring unit, and elapse observing unit for acquiring the current time information and observing whether or not the current time passes over the term of validity on the basis of the time information and the term of validity calculated by the term-of-validity calculating unit, and wherein the operating state controlling unit is adapted to issue the transition-to-power-save command for causing the state to be changed from the active state to the power-saving state to the power-save switching unit when the output process of the output data is completed or when the term of validity of the output data is expired on the basis of the detection result of the output process completion detecting unit and the observed result of the elapse observing unit, and to issue the switching-time-change command for causing the switching time which is currently set in the destination output device of the output data to be changed into the switching time indicated by the set time information corresponding to the output data to the switching time changing unit.

In this arrangement, the set time information acquiring unit can acquire the set time information as the information of the switching time preset in the destination output device of the output data after the device having the output data storing unit acquires the output data, the term-of-validity calculating unit can acquire the time information after the device having the output data storing unit acquires the output data and calculate the term of validity of the active state for the output data on the basis of the acquired time information and the set time information acquired by the set time information acquiring unit, and the elapse observing unit can obtain the current time information and observe whether or not the current time is passed over the term of validity on the basis of the time information and the term of validity calculated by the term-of-validity calculating unit.

Then, the transition-to-power-save command for causing the state to be changed from the active state to the power-saving state is issued to the power-save switching unit when the output process of the output data is completed or when the term of validity of the output data is expired on the basis of the detection result of the output process completion detecting unit and the observed result of the elapse observing unit, and the switching-time-change command for causing the switching time which is currently set in the destination output device of the output data to be changed into the switching time indicated by the set time information corresponding to the output data is issued to the switching time changing unit.

Therefore, since it is adapted in such a manner that the currently set switching time is restored to the switching time which is set when the output data is acquired (the switching time indicated by the set time information), for example, to the switching time which is originally set in the output device when the output process of the output data stored in the output data memory unit is completed or when the term of validity of the output data is expired, for example, when the switching time is changed by the instruction from the user, meaningless increase in power consumption by being set to the switching time longer than original switching time continuously or deterioration of convenience of the output device by being set to the switching time shorter than original switching time continuously can be prevented.

The above-described "elapse observing unit" can perform at least one of continuous observation and discontinuous observation.

Mode 7

In addition to the output system in Mode 6, the output system according to Mode 7 further includes a term-of-validity updating unit for updating the term of validity on the basis of the switching-time-changed by the switching time changing unit and wherein the operating state controlling unit is adapted in such a manner that in a case in which the output data memory unit has a plurality of output data within the term of validity for the identical output device stored therein, when the output process of any one of the plurality of stored output data is completed or when the term of validity of any one of the output data is expired on the basis of the detected result of the output process completion detecting unit and the observed result of the elapse observing unit, the set time information corresponding to the output data whose term of validity will be expired next is changed into the set time information corresponding to the output data whose output process is completed or whose term of validity is expired, and that the transition-to-power-save command for causing the state to be changed from the active state to the power-saving state is issued to the power-save switching unit and the switching-time-change command for causing the switching time which is currently set in the output device to be changed into the set time information corresponding to the output data whose output process is completed lastly or the output data whose term of validity is expired lastly out of the stored plurality of output data is issued to the switching time changing unit when there is no more output data within the term of validity left among the plurality of stored output data.

In this arrangement, the term of validity can be updated by the term-of-validity updating unit on the basis of the switching-time-changed by the switching time changing unit.

In addition, the operating state controlling unit is adapted in such a manner that in a case in which the output data memory unit has the plurality of output data within the term of validity for the identical output device stored therein, when the output process of any one of the plurality of stored output data is completed or when the term of validity of any one of the output data is expired on the basis of the detected result of the output process completion detecting unit and the observed result of the elapse observing unit, the set time information corresponding to the output data whose term of validity will be expired next is changed into the set time information corresponding to the output data whose output process is completed or whose term of validity is expired. Furthermore, the transition-to-power-save command for causing the state to be changed from the active state to the power-saving state is issued to the power-save switching unit and the switching-time-change command for causing the switching time which is currently set in the output device to be changed into the set time information corresponding to the output data whose output process is completed lastly or the output data whose term of validity is expired lastly out of the stored plurality of output data is issued to the switching time changing unit when there is no more output data within the term of validity left among the plurality of stored output data.

In other words, since when the authentication process and the output process for the output data which is stored (acquired) at the earliest time among the plurality of output data whose stored term of validity is not elapsed are not executed within the term of validity, or when the authentication process and the output process of the output data is completed within the term of validity, the set time information for the remaining output data is changed into the set time information for the output data stored at the earliest time. Therefore, the switching time set in the output device finally is changed into the switching time indicated by the set time information corresponding to the output data which is stored at the earliest time among those stored in the output data memory unit. Accordingly, for example, even when the switching time set to the output device is changed into the user-desired time and the information of the changed switching time is acquired as the set time information, the original switching time information is succeeded by the remaining output data, and hence the original (for example, initial) switching time is set to the output device after all the output processes of the output data whose stored term of validity is not elapsed are completed or after all the terms of validity of the output data whose store term of validity is not elapsed are expired. Therefore, meaningless increase in power consumption by being set to the switching time longer than original switching time continuously or deterioration of convenience of the output device by being set to the switching time shorter than original switching time continuously can be prevented.

Mode 8

In order to achieve the above-described object, a printing system in Mode 8 is a printing system having a printing device that executes a printing process on the basis of a printing job so that the printing device executes the printing process after having acquired authentication including: printing job acquiring unit for acquiring the printing job; printing job storing unit for storing the printing job acquired by the printing job acquiring unit in printing job memory unit; authentication information acquiring unit for acquiring authentication information; usage-qualification determining unit for determining a usage qualification of the printing job on the basis of the authentication information acquired by the authentication information acquiring unit; operating state controlling unit for controlling a state of the printing device; printing process completion detecting unit for detecting completion of the printing process in the printing device; and power-save switching unit for switching a state of the printing device into either one of an active state in which the output process to be performed by a print processing unit is enabled and a power-saving state in which a drive power during a stand-by time for the printing process on the basis of either one of a command from the operating state controlling unit and an elapsed time from a switching time which corresponds to a stand-by time for the active state until the state of the printing device is switched from the active state to the power-saving state (this switching operation is performed automatically), wherein the operating state controlling unit issues a power-save-cancel command for causing the power-saving state to be changed into the active state to the power-save switching unit after the device having the printing job storing unit acquires the printing job, and a transition-to-power-save command for causing the state to be changed from the active state to the power-saving state to the power-save switching unit when the printing process of the printing job is completed is detected by the printing process completion detecting unit.

In this arrangement, when the printing job is acquired by the printing job acquiring unit, in the device having the printing job storing unit, the printing job storing unit stores the acquired printing job in the printing job memory unit.

The operating state controlling unit issues a power-save-cancel command for causing the state of the printing device from the power-saving state to the active state to the power-save switching unit after the device having the printing job storing unit acquires the printing job, and issues the transition-to-power-save command for causing the state from the active state to the power-saving state to the power-save switching unit when the printing process of the printing job is completed by the printing process completion detecting unit.

In the printing device, when the power-save-cancel command is entered, if the current state is the power-saving state, the current state is changed from the power-saving state to the active state by the power-save switching unit. In addition, when the transition-to-power-save command is entered, the current state is changed from the active state to the power-saving state by the power-save switching unit if the current state is active state.

When the authentication information is acquired by the authentication information acquiring unit, the usage qualification of the printing job is determined by the usage-qualification determining unit on the basis of the acquired authentication information.

In the printing device, when the printing device is in the active state, the printing job is performed on the basis of the printing job which is determined to have the usage qualification by the usage-qualification determining unit out of the printing jobs stored in the printing job memory unit.

Therefore, since the output process of the power-save-cancel command is executed after the device having the printing job storing unit acquires the printing job, when the state of the printing device is the power-saving state, the state is changed to the active state, and when the printing process of the printing job is completed, the state is changed from the active state to the power-saving state without taking much time. Therefore, once authenticated, the user can cause the printing device to start the printing process without the stand-by time for changing from the power-saving state to the active state or less stand-by time in comparison with the normal state, and can cause the printing device to maintain the active state only for a period required for completing the print and then save the power in the power-saving state in other states.

Here, the above-described printing job includes a data to be printed (hereinafter, referred to as "printing data") such as a created file itself like a document file or an image file created by a document editor or an image editor or an intermediate file obtained by converting the document file or the image file into a description in an intermediate language (for example, a page description language such as PDL) and information relating to the printing request including print set information such as color/monochrome, paper size, the number of layout, or one side/both sides, information for determination including user information for making determination by the usage-qualification determining unit, information of the destination printing device (MAC address, IP address, and so on), information on an instruction source device (MAC address, IP address, and so on) and time information on the time of issuing the print instruction. Therefore, as the printing process executed in the printing device is not only the process of printing and outputting characters or graphics on a printing medium (paper, surface of the CD, DVD media, and so on) on the basis of the printing job, but may include also the process of converting the document file or the image file into the description of the intermediate language or the rendering process for converting the intermediate file into the image data (for example, bitmap data) for printing. Hereinafter, it is also applied to a printing system in Mode 9, a print instruction issuing device in Mode 16, a printing device management device in Mode 18, a printing device in Modes 21 and 22, a print instruction issuing program in Mode 27, a printing device management program in Mode 29, a printing device control program in Mode 32 and Mode 33, and a printing method in Modes 38 and 39.

The above-described "authentication information" is information for determining validity of user such as the user identification information or the password information. Hereinafter, it is also applied to a printing system in Mode 9, a print instruction issuing device in Mode 16, a printing device management device in Mode 18, a printing device in Modes 21 and 22, a print instruction issuing program in Mode 27, a printing device management program in Mode 29, a printing device control program in Mode 32 and Mode 33, and a printing method in Modes 38 and 39.

The above-described "usage-qualification determination process ("authentication process" is preferably started immediately after the authentication information acquiring unit acquires the authentication information. Hereinafter, it is also applied to a printing system in Mode 9, a print instruction issuing device in Mode 16, a printing device management device in Mode 18, a printing device in Modes 21 and 22, a print instruction issuing program in Mode 27, a printing device management program in Mode 29, a printing device control program in Mode 32 and Mode 33, and a printing method in Modes 38 and 39.

The above-described "operating state controlling unit" executes the switching process between the active state in which the power-save-cancel command or the transition-to-power-save command is issued to the power-save switching unit to immediately enable the printing process and the power-saving state in which the drive power of the printing device is reduced. Hereinafter, it is also applied to a printing system in Mode 9, a print instruction issuing device in Mode 16, a printing device management device in Mode 18, a printing device in Modes 21 and 22, a print instruction issuing program in Mode 27, a printing device management program in Mode 29, a printing device control program in Mode 32 and Mode 33, and a printing method in Modes 38 and 39.

The above-describe "operating state controlling unit" determines that the device having the printing job storing unit acquires the printing job, for example, on the basis of the event which is notified in the stage of acquisition of the printing job by the printing job storing unit. Hereinafter, it is also applied to a printing system in Mode 9, a print instruction issuing device in Mode 16, a printing device management device in Mode 18, a printing device in Modes 21 and 22, a print instruction issuing program in Mode 27, a printing device management program in Mode 29, a printing device control program in Mode 32 and Mode 33, and a printing method in Modes 38 and 39.

The above-described "printing process completion detecting unit" determines the termination of the printing process, for example, by giving inquiries to a printing job management function in the printing device. The printing job management function is a known function in the general printing devices. Hereinafter, it is also applied to a printing system in Mode 9, a print instruction issuing device in Mode 16, a printing device management device in Mode 18, a printing device in Modes 21 and 22, a print instruction issuing program in Mode 27, a printing device management program in Mode 29, a printing device control program in Mode 32 and Mode 33, and a printing method in Modes 38 and 39.

The above-described "power-save-cancel command" may have a role to clear a measured value of a timer or the like that measures the elapsed time of the active state when the printing device is in the active state in addition to the role of switching the state of the printing device from the power-saving state to the active state. Hereinafter, it is also applied to a printing system in Mode 9, a print instruction issuing device in Mode 16, a printing device management device in Mode 18, a printing device in Modes 21 and 22, a print instruction issuing program in Mode 27, a printing device management program in Mode 29, a printing device control program in Mode 32 and Mode 33, and a printing method in Modes 38 and 39.

The above-described "after . . . acquires" may be after reception of the printing job, for example, at any time before or after storing the printing job into the printing job memory unit. However, considering delay in the network or the like, it is preferable to perform the acquisition process for the respective information and the output process for the respective commands at a timing as early as possible. Hereinafter, it is also applied to a printing system in Mode 9, a print instruction issuing device in Mode 16, a printing device management device in Mode 18, a printing device in Modes 21 and 22, a print instruction issuing program in Mode 27, a printing device management program in Mode 29, a printing device control program in Mode 32 and Mode 33, and a printing method in Modes 38 and 39.

This system may be configured to realize the printing device as a network system that is connected to other devices, terminals, and equipment so as to be capable of mutual communication. In this case, the printing job memory unit, the printing job storing unit, the authentication information acquiring unit, the usage-qualification determining unit, the operating state controlling unit, and the output process completion detecting unit may belong to any one of the printing device and other equipment. Hereinafter, it is also applied to a printing system in Mode 9.

Mode 9

In order to achieve the above-described object, a printing system in Mode 9 is a printing system having a printing device that executes a printing process on the basis of a printing job so that the printing device executes the printing process after having acquired authentication including: printing job acquiring unit for acquiring the printing job; printing job storing unit for storing the printing job acquired by the printing job acquiring unit in printing job memory unit; authentication information acquiring unit for acquiring authentication information; usage-qualification determining unit for determining a usage qualification of the printing job on the basis of the authentication information acquired by the authentication information acquiring unit; operating state controlling unit for controlling a state of the printing device; and printing process completion detecting unit for detecting completion of the printing process in the printing device;

wherein the printing device includes; print processing unit for executing the printing process on the basis of the printing job which is determined to have the usage qualification by the usage-qualification determining unit out of the printing jobs stored in the printing job memory unit; and power-save switching unit for switching a state of the printing device into either one of an active state in which the printing process to be performed by the print processing unit is enabled and a power-saving state in which a drive power during a stand-by time for the printing process on the basis of either one of a command from the operating state controlling unit and an elapsed time from a switching time which corresponds to a stand-by time for the active state until the state of the printing device is switched from the active state to the power-saving state (this switching operation is performed automatically), and the operating state controlling unit outputs a power-save-cancel command for causing the power-saving state to be changed into the active state to the power-save switching unit after the device having the printing job storing unit acquires the printing job, and a transition-to-power-save command for causing the state to be changed from the active state to the power-saving state is outputted to the power-save switching unit when the printing process of the printing job is completed is detected by the printing process completion detecting unit.

In this arrangement, when the printing job is acquired by the printing job acquiring unit, in the device having the printing job storing unit, the printing job storing unit stores the acquired printing job in the printing job memory unit.

The operating state controlling unit issues a power-save-cancel command for causing the state of the printing device from the power-saving state to the active state to the power-save switching unit after the device having the printing job storing unit acquires the printing job, and issues the transition-to-power-save command for causing the state from the active state to the power-saving state to the power-save switching unit when the printing process of the printing job is completed is detected by the printing process completion detecting unit.

In the printing device, when the power-save-cancel command is entered, if the current state is the power-saving state, the current state is changed from the power-saving state to the active state by the power-save switching unit. In addition, when the transition-to-power-save command is entered, the current state is changed from the active state to the power-saving state by the power-save switching unit if the current state is active state.

When the authentication information is acquired by the authentication information acquiring unit, the usage qualification of the printing job is determined by the usage-qualification determining unit on the basis of the acquired authentication information.

In the printing device, when the printing device is in the active state, the printing process is performed by the print processing unit on the basis of the printing job which is determined to have the usage qualification by the usage-qualification determining unit out of the printing jobs stored in the printing job memory unit.

Therefore, since the output process of the power-save-cancel command is executed after the device having the printing job storing unit acquires the printing job, when the state of the printing device is power-saving state, the state is changed to the active state, and when the printing process of the printing job is completed, the state is changed from the active state to the power-saving state without taking much time. Therefore, once authenticated, the user can cause the printing device to start the printing process without the stand-by time for changing from the power-saving state to the active state or less stand-by time in comparison with the normal state, and can cause the printing device to maintain the active state only for a period required for completing the print and then save the power in the power-saving state in other states.

Mode 10

The printing system in Mode 10 is, in the printing system in Mode 8 or 9, wherein the print instruction issuing device that issues a printing instruction for the printing job is connected to the device having the printing job storing unit so as to be capable of communicating data, the print instruction issuing device includes print instruction issuing unit for transmitting the printing job to the printing job storing unit corresponding to the destination printing device of the printing job; and switching-time-change instruction issuing unit for issuing instruction to change the switching time which is preset in the printing device;

the printing device includes switching time changing unit for changing the switching time which is preset in the printing device on the basis of a switching-time-change command from the operating state controlling unit, and the operating state controlling unit is adapted to output the switching-time-change command to the switching time changing unit according to the instruction from the switching-time-change instruction issuing unit, and to output the switching-time-change command for restoring the switching time which is currently set in the destination printing device into the switching time before being changed to the switching time changing unit when the printing process completion detecting unit detects that the printing process of the printing job corresponding to the printing device whose switching time is changed is completed, or when the switching time after the change is elapsed.

In this arrangement, in the print instruction issuing device, the printing job is transmitted to the device having the printing job storing unit corresponding to the destination printing device by the printing instruction issuing unit, and the switching-time-change instruction which is preset in the printing device is executed by the switching-time-change instruction issuing unit.

On the other hand, when the switching-time-change instruction is issued, the operating state controlling unit outputs the switching-time-change command to the switching time changing unit. In addition, the printing process completion detecting unit outputs the switching-time-change command for restoring the switching time which is currently set in the destination output device into the switching time before being changed when the printing process completion detecting unit detects that the printing process of the printing job corresponding to the printing device whose switching time is changed is completed, or when the switching time after the change is elapsed.

Therefore, the user can change the switching time preset in the printing device into the desired switching time, for example, by giving an instruction of the user-desired switching time via the switching-time-change instruction issuing unit. Accordingly, for example, by elongating the switching time to a length longer the normal length, the active state continues by the length corresponding to the elongated amount. Consequently, even when acquisition of the authentication is delayed correspondingly, the printing device is caused to execute the printing process immediately before being changed into the power-saving state. In contrast, by shortening the switching time to a length shorter than normal, the amount of power consumption of the printing device can be reduced correspondingly.

Since it is adapted to restore the changed switching time into the switching time before being changed when the printing process of the printing job stored in the printing job memory unit is completed or the switching time is elapsed when the switching time is changed, meaningless increase in power consumption by being set to the switching time longer than original switching time continuously or deterioration of convenience of the printing device by being set to the switching time shorter than original switching time continuously can be prevented.

The above-described "printing job storing unit corresponding to the destination printing device" represents the printing job storing unit for storing the printing job printed by the printing device. It is also applied to Mode 40.

Mode 11

In addition, the printing system in Mode 11 is, in the printing system according to any one of Modes 8 to 9, wherein a printing device management device that manages the printing device is connected to the printing device so as to be capable of data communication, the printing device management device includes the printing job acquiring unit; the printing job storing unit; the authentication information acquiring unit; the usage-qualification determining unit; the operating state controlling unit; printing process completion detecting unit; and the printing job transmitting unit for transmitting the printing job that is determined to have the usage qualification by the usage-qualification determining unit out of the printing jobs stored in the printing job memory unit to the printing device, and the printing device includes printing job receiving unit for receiving the printing job and the print processing unit for executing the printing process on the basis of the printing job received by the printing job receiving unit.

In this arrangement, in the printing device management device, when the printing job is acquired by the printing job acquiring unit, the printing job storing unit stores the acquired printing job in the printing job memory unit. When the power-save-cancel command for causing the operating state controlling unit to change the state of the output device from the power-saving state to the active state after having acquired the printing job is issued to the power-save switching unit, and the printing process completion detecting unit detects that the printing process of the printing job is completed, the transition-to-power-save command for causing the state to be changed from the active state to the power-saving state is issued to the power-save switching unit. When the authentication information acquiring unit acquires the authentication information, the usage-qualification determining unit determines the usage qualification of the printing job stored in the printing job memory unit on the basis of the acquired authentication information. When it is determined to have the usage qualification consequently, the printing job transmitting unit transmits the printing job having the usage qualification to the printing device.

On the other hand, in the printing device, when the printing job receiving unit receives the printing job from the printing device management device in the active state, the print processing unit performs the printing process on the basis of the received printing job.

Therefore, in the printing device management device, the state of the printing device can be controlled, and hence the state of a plurality of the printing devices can advantageously be controlled together by a single printing device management device without providing a function for controlling the state of the printing device to the respective printing devices.

Mode 12

The printing system in Mode 12 is, in the printing system according to any one of Modes 8 to 9, wherein the printing device includes the printing job acquiring unit; the printing job storing unit; the authentication information acquiring unit; the usage-qualification determining unit; the operating state controlling unit; and the printing process completion detecting unit.

In this arrangement, when the printing job is acquired by the printing job acquiring unit, the printing job storing unit stores the acquired printing job in the printing job memory unit. When the power-save-cancel command for causing the operating state controlling unit to change the state of the printing device from the power-saving state to the active state after having acquired the printing job is issued to the power-save switching unit, and the printing process completion detecting unit detects that the printing process of the printing job is completed, the transition-to-power-save command for causing the state to be changed from the active state to the power-saving state is issued to the power-save switching unit. When the authentication information acquiring unit acquires the authentication information, the usage-qualification determining unit determines the usage qualification of the printing job stored in the printing job memory unit on the basis of the acquired authentication information.

Therefore, since the printing device has the function to control the state of the printing device by itself, the printing device can advantageously bring out the power-saving function by itself without providing other devices having a function to control the state of the printing device, such as the printing device management device.

Mode 13

In addition to the printing system according to any one of Modes 10 to 12, the printing system in Mode 13 further include;

set time information acquiring unit for acquiring the set time information as the information on the switching time preset in the destination printing device of the printing job after the device having the printing job storing unit acquires the printing job; term-of-validity calculating unit for acquiring the time information after the device having the printing job storing unit acquires the printing job and calculating the term of validity of the active state for the printing job on the basis of the acquired time information and the set time information acquired by the set time information acquiring unit, and elapse observing unit for obtaining the current time information and observing whether or not the current time passes over the term of validity on the basis of the time information and the term of validity calculated by the term-of-validity calculating unit, and wherein the operating state controlling unit is adapted to issue the transition-to-power-save command for causing the state to be changed from the active state to a power-saving state to the power-save switching unit when the printing process of the printing job is completed or when the term of validity of the printing job is expired on the basis of the detection result of the printing process completion detecting unit and the observed result of the elapse observing unit, and to issue the switching-time-change command for causing the switching time which is currently set in the destination printing device of the printing job to be changed into the switching time indicated by the set time information corresponding to the printing job to the switching time changing unit.

In this arrangement, the set time information acquiring unit can acquire the set time information as the information of the switching time preset in the destination output device of the printing job after the device having the printing job storing unit acquires the printing job, the term-of-validity calculating unit can acquire the time information after the device having the printing job storing unit acquires the printing job and calculate the term of validity of the active state for the printing job on the basis of the acquired time information and the set time information acquired by the set time information acquiring unit, and the elapse observing unit can obtain the current time information and observe whether or not the current time is passed over the term of validity on the basis of the time information and the term of validity calculated by the term-of-validity calculating unit.

Then, the operating state controlling unit issues the transition-to-power-save command for causing the state to be changed from the active state to the power-saving state to the power-wave switching unit when the printing process of the printing job is completed or when the term of validity of the printing job is expired on the basis of the detection result of the printing process completion detecting unit and the observed result of the elapse observing unit, and issues the switching-time-change command for causing the switching time which is currently set in the destination printing device of the printing job to be changed into the switching time indicated by the set time information corresponding to the printing job to the switching time changing unit.

Therefore, since it is adapted in such a manner that the currently set switching time is restored to the switching time which is set when the printing job is acquired the switching time (indicated by the set time information), for example, to the switching time which is originally set in the printing device when the printing process of the printing job stored in the printing job memory unit is completed or when the term of validity of the printing job is expired, for example, when the switching time is changed by the instruction from the user, meaningless increase in power consumption by being set to the switching time longer than original switching time continuously or deterioration of convenience of the printing device by being set to the switching time shorter than original switching time continuously can be prevented.

The above-described "elapse observing unit" can perform at least one of continuous observation and discontinuous observation. It is also applied to the printing method in Mode 43.

Mode 14

In addition to the printing system in Mode 13, the printing system in Mode 14 further includes term-of-validity updating unit for updating the term of validity on the basis of the switching-time-changed by the switching time changing unit and wherein:

the operating state controlling unit is adapted in such a manner that in a case in which the printing job memory unit has a plurality of printing jobs within the term of validity for the identical printing device stored therein, when the printing process of any one of the plurality of stored printing jobs is completed or when the term of validity of any one of the printing job is expired on the basis of the detected result of the printing process completion detecting unit and the observed result of the elapse observing unit, the set time information corresponding to the printing job whose term of validity will be expired next is changed into the set time information corresponding to the printing job whose printing process is completed or whose term of validity is expired, and that the transition-to-power-save command for causing the state to be changed from the active state to the power-saving state is issued to the power-save switching unit and the switching-time-change command for causing the switching time which is currently set in the printing device to be changed into the set time information corresponding to the printing job whose printing process is completed lastly or the printing job whose term of validity is expired lastly out of the stored plurality of printing jobs is issued to the switching time changing unit when there is no more printing job within the term of validity left among the plurality of stored printing job.

In this arrangement, the term of validity can be updated by the term-of-validity updating unit on the basis of the switching-time-changed by the switching time changing unit.

In addition, in a case in which a plurality of printing jobs within the term of validity for the identical printing device are stored in the data memory unit, and when the printing process of any one of the plurality of stored printing jobs is completed or when the term of validity of any one of the printing job is expired on the basis of the detected result of the printing process completion detecting unit and the observed result of the elapse observing unit, the term-of-validity updating unit changes the set time information corresponding to the printing job whose term of validity will be expired next into the set time information corresponding to the printing job whose printing process is completed or whose term of validity is expired. Furthermore, the transition-to-power-save command for causing the state to be changed from the active state to the power-saving state is issued to the power-save switching unit and the switching-time-change command for causing the switching time which is currently set in the printing device to be changed into the set time information corresponding to the printing job whose printing process is completed lastly or the printing job whose term of validity is expired lastly out of the stored plurality of printing jobs is issued to the switching time changing unit when there is no more printing job within the term of validity left among the plurality of stored printing job.

In other words, since when the authentication process and the printing process for the printing job which is stored (acquired) at the earliest time among the plurality of printing jobs whose stored term of validity is not elapsed are not executed within the term of validity, or when the authentication process and the printing process of the printing job is completed within the term of validity, the set time information for the remaining printing job is changed into the set time information for the printing job stored at the earliest time. Therefore, the switching time set in the printing device finally is changed into the switching time indicated by the set time information corresponding to the printing job which is set at the earliest time among those stored in the printing job memory unit. Accordingly, for example, even when the switching time preset to the printing device is changed into the user-desired time and the information of the changed switching time is acquired as the set time information, the original switching time information is succeeded by the remaining printing job, and hence the original (for example, initial) switching time is set to the printing device after all the printing process of the printing job whose stored term of validity is not elapsed are expired or after all the terms of validity of the printing job whose stored term of validity is not elapsed are expired. Therefore, meaningless increase in power consumption by being set to the switching time longer than original switching time continuously or deterioration of convenience of the printing device by being set to the switching time shorter than original switching time continuously can be prevented.

Mode 15

In addition, the printing system in Mode 15 is, in the printing system according to any one of Modes 10 to 14, wherein the upper limit of the switching time to be set is within a range of 15 to 30 minutes.

In this arrangement, the upper limit of the switching time that can be set is within the range of 15 to 30 minutes. The range of the upper limit of the time of 15 to 30 minutes is determined on the basis of the result of the research such that the time from transmission of the printing job from the print instruction issuing device until the printing process for the printing job is executed in the printing device is generally within 30 minutes. In particular, the case in which the printing process is executed after more than 30 minutes is, in most cases, because of a specific reason such that the user forgets that he/she has transmitted the printing job or the like. In such a case, the printing process of the printing job is not executed in many cases.

Therefore, setting of the switching time with high effect of power saving without impairing convenience is advantageously enabled by issuing an instruction to set the switching time to a proper time that does not impair convenience within the range between 15 to 30 minutes.

In addition to the upper limit time, it is also possible to set a proper lower limit time which does not impair convenience on the basis of the result of investigation. It is also applicable to the print instruction issuing device in Mode 8, the print instruction issuing program in Mode 20, and the printing method in Mode 30.

Mode 16

On the other hand, in order to achieve the above-described object, a print instruction issuing device in Mode 16 is a print instruction issuing device for issuing a print instruction for a printing job including: print instruction issuing unit for transmitting the printing job which corresponds to the destination printing device of the printing job to the device having printing job storing unit for storing the printing job in printing job memory unit; and switching-time-change instruction issuing unit for issuing the instruction to change the switching time which corresponds to a stand-by time for an active state until the state of the printing device set in the printing device is changed from the active state in which the printing process is enabled to a power-saving state for reducing a drive power during the stand-by time for the printing process.

In this arrangement, the same effects and advantages as the printing instruction issuing device in the printing system in Mode 10 are achieved.

Mode 17

The print instruction issuing device in Mode 17 is, in the print instruction issuing device in Mode 16, wherein the upper limit of the switching time that can be instructed by the switching-time-change instruction issuing unit is within the range of 15 to 30 minutes.

In this arrangement, the same effects and advantages as the print instruction issuing device in the printing system in Mode 15 are achieved.

Mode 18

On the other hand, in order to achieve the above described object, a printing device management device in Mode 18 is a printing device management device that manages a printing device for executing a printing process on the basis of a printing job, including: printing job acquiring unit for acquiring the printing job; printing job storing unit for storing the printing job acquired by the printing job acquiring unit in printing job memory unit; authentication information acquiring unit for acquiring authentication information; usage-qualification determining unit for determining a usage qualification of the printing job on the basis of the authentication information acquired by the authentication information acquiring unit; operating state controlling unit for controlling the state of the printing device; printing process completion detecting unit for detecting completion of the printing process in the printing device; and printing job transmitting unit for transmitting the printing job which is determined to have the usage qualification by the usage-qualification determining unit out of the printing jobs stored in the printing job memory unit to the printing device, wherein the operating state controlling unit transmits a power-save-cancel command for causing a power-saving state to be changed to an active state to the printing device after having acquired the printing job, and transmits a transition-to-power-save command for changing the state from the active state to the power-saving state to the printing device when the printing process completion detecting unit detects that the printing process of the printing job is completed.

In this arrangement, the same effects and advantages as the printing device management device in the printing system in Mode 11 are obtained.

Mode 19

In addition to the printing device management device in Mode 18, the printing device management device in Mode 19 further includes: set time information acquiring unit for acquiring set time information which corresponds to information of the switching time preset in the destination printing device of the printing job after having acquired the printing job; term-of-validity calculating unit for acquiring time information after the device having the printing job storing unit acquires time information after having acquired the printing job and calculating a term of validity of the active state for the printing job on the basis of the acquired time information and the set time information acquired by the set time information acquiring unit; and elapse observing unit for acquiring current time information and observing whether or not the current time passed over the term of validity on the basis of the time information and the term of validity calculated by the term-of-validity calculating unit, and wherein the operating state controlling unit issues the transition-to-power-save command for causing the state from the active state to the power-saving state to the destination printing device when the printing process of the printing job is completed or the term of validity of the printing job is expired, and issues the switching-time-change command for causing the switching time currently set in the destination printing device of the printing job to be changed into the switching time indicated by the set time information corresponding to the printing job to the destination printing device on the basis of the detected result of the printing process completion detecting unit and the observed result of the elapse observing unit.

In this arrangement, the same effects and advantages as the printing device management device in the printing system in Mode 13, which belongs to the printing system in Mode 11 are achieved.

Mode 20

In addition to the printing device management device in Mode 19, the printing device management device according to Mode 20 further includes term-of-validity updating unit for updating the term of validity on the basis of the switching-time-changed by the switching time changing unit and wherein:

the operating state controlling unit is adapted in such a manner that in a case in which the data memory unit has a plurality of printing jobs within the term of validity for the identical printing device stored therein, when the printing process of the printing job of any one of the plurality of stored printing jobs is completed or when the term of validity of any one of the printing jobs is expired on the basis of the detected result of the printing process completion detecting unit and the observed result of the elapse observing unit, the set time information corresponding to the printing job whose term of validity will be expired next is changed into the set time information corresponding to the printing job whose printing process is completed or whose term of validity is expired, and that the transition-to-power-save command for causing the state to be changed from the active state to the power-saving state is issued to the destination printing device and the switching-time-change command for causing the switching time which is currently set in the printing device to be changed into the set time information corresponding to the printing job, whose printing process is completed lastly, or the printing job, whose term of validity is expired lastly out of the stored plurality of printing jobs, is issued to the printing device when there is no more printing job within the term of validity left among the plurality of stored printing job.

In this arrangement, the same effects and advantages as the printing device management device in the printing system in Mode 14 which belongs to the printing system in Mode 11 are achieved.

Mode 21

On the other hand, in order to achieve the above-described object, a printing device in Mode 21 is a printing device for executing a printing process on the basis of a printing job including: print processing unit for executing the printing process on the basis of the printing job having a usage qualification out of the printing jobs stored in printing job memory unit; and power-save switching unit for switching the state of the printing device into any one of an active state that enables the printing process by the print processing unit and a power-saving state that reduces a drive power during a stand-by time for the printing process on the basis of any one of a command from an operating state controlling unit and an elapsed time from a switching time which corresponds to a stand-by time for the active state until the state of the printing device is switched from the active state to the power-saving state.

In this arrangement, the same effects and advantages as in the printing device in the printing system in Mode 9 are achieved.

Mode 22

In order to achieve the above-described object, a printing device in Mode 22 is a printing device for executing a printing process on the basis of a printing job, including printing job receiving unit for receiving the printing job; print processing unit for executing the printing process on the basis of the printing job received by the printing job receiving unit; and power-save switching unit for switching a state of the printing device into any one of an active state that enables the printing process by the print processing unit and a power-saving state that reduces a drive power during a stand-by time for the printing process on the basis of any one of a command from operating state controlling unit for controlling the sate of the printing device and an elapsed time from a switching time which corresponds to a stand-by time for the active state until the state of the printing device is switched from the active state to the power-saving state.

In this arrangement, the same effects and advantages as the printing device in the printing system in Mode 11 are achieved.

Mode 23

In addition to the printing device in Modes 21 or 22, the printing device in Mode 23 further includes switching time changing unit for changing the switching time preset in the printing device on the basis of the switching-time change command from the operating state controlling unit.

In this arrangement, the same effects and advantages as the printing device in the printing system in Mode 10 are achieved.

Mode 24

In addition to the printing device in any one of Modes 21 to 23, the printing device in Mode 24 further includes: printing job acquiring unit for acquiring the printing job; printing job storing unit for storing the printing job acquired by the printing job acquiring unit into the printing job memory unit; authentication information acquiring unit for acquiring authentication information; usage-qualification determining unit for determining the usage qualification of the printing job on the basis of the authentication information acquired by the authentication information acquiring unit; and the operating state controlling unit for controlling the state of the printing device; and wherein the operating state controlling unit issues the power-save-cancel command for causing the power-saving state to be changed into the active state after having acquired the printing job, and when a printing process completion detecting unit detects that the printing process of the printing job is completed, issues a transition-to-power save command for causing the state to be changed from the active state to the power-saving state to the power-save switching unit.

In this arrangement, the same effects and advantages as the printing device in the printing system in Mode 12 are obtained.

Mode 25

In addition to the printing device in Mode 24, the printing device in Mode 25 further includes; set time information acquiring unit for acquiring set time information which corresponds to information of the switching time preset in the printing device after having acquired the printing job; term-of-validity calculating unit for acquiring time information after having acquired the printing job and calculating the term-of-validity of the active state for the printing job on the basis of the acquired time information and the set time information acquired by the set time information acquiring unit; and elapse observing unit for acquiring current time information and observing whether or not the current time passed over the term-of-validity on the basis of the time information and the term-of-validity calculated by the term-of-validity calculating unit, and wherein the operating state controlling unit issues the transition-to-power-save command for causing the state from the active state to the power-saving state to the power-save switching unit when the printing process of the printing job is completed or the term of validity of the printing job is expired, and issues the switching-time-change command for causing the switching time currently set in the destination printing device of the printing job to be changed into the switching time indicated by the set time information corresponding to the printing job on the basis of the detected result of the printing process completion detecting unit and the observed result of the elapse observing unit.

In this arrangement, the same effects and advantages as the printing device in the printing system in Mode 13 which belongs to the printing system in Mode 12 are achieved.

Mode 26

In addition to the printing device in Mode 25, the printing device in Mode 26 further includes term-of-validity updating unit for updating the term of validity on the basis of the switching-time-changed by the switching time changing unit and wherein the operating state controlling unit is adapted in such a manner that in a case in which the data memory unit has a plurality of printing jobs within the term of validity stored therein, when the printing process of any one of the plurality of stored printing jobs is completed or when the term of validity of any one of the printing jobs is expired on the basis of the detected result of the printing process completion detecting unit and the observed result of the elapse observing unit, the set time information corresponding to the printing job whose term of validity will be expired next is changed into the set time information corresponding to the printing job whose printing process is completed or whose term of validity is expired, and that the transition-to-power-save command for causing the state to be changed from the active state to the power-saving state is issued to the power-save switching unit and the switching-time-change command for causing the switching time which is currently set in the printing device to be changed into the set time information corresponding to the printing job, whose printing process is completed lastly, or the printing job, whose term of validity is expired lastly out of the stored plurality of printing job, is issued to the switching time changing unit when there is no more printing job within the term of validity left among the plurality of stored printing job.

In this arrangement, the same effects and advantages as the printing device in the printing system in Mode 14 which belongs to the printing system in Mode 12 are obtained.

Mode 27

In order to achieve the above-described object, a print instruction issuing program in Mode 27 is a print instruction issuing program used for causing a computer that is operated as a print instruction issuing device for issuing a print instruction for a printing job to execute, including a program used for causing the computer to execute a process including a print instruction issuing step of transmitting the printing job corresponding to the destination printing device of the printing job to a device having printing job storing unit for storing the printing job in printing job memory unit, and a switching-time-change instruction issuing step of issuing an instruction for changing a switching time which corresponds to a stand-by time for an active state until a state of the printing device set in the printing device from the active state in which the printing process is enabled to a power-saving state in which a drive power at the stand-by time for the printing process is reduced.

In this arrangement, when the program is read by the computer, and the computer executes the process according to the read program, the same effects and advantages as the print instruction issuing device in Mode 16 are achieved.

Mode 28

In addition, the print instruction issuing program in Mode 28 is, in the print instruction issuing program in Mode 27, wherein the upper limit of the switching time that can be specified in the switching-time-change instruction issuing step is within the range of 15 to 30 minutes.

In this arrangement, when the program is read by the computer and the computer executes the process according to the read program, the same effects and advantages as the printing instruction issuing device in Mode 17 are achieved.

Mode 29

In order to achieve the above-described object, a printing device management program in Mode 29 is a printing device management program used for causing a computer that is operated as a printing device management device for managing a printing device for executing a printing process on the basis of a printing job, including a program used for causing the computer to executes a process including: a printing job acquiring step of acquiring the printing job; a printing job storing step of storing the printing job acquired in the printing job acquiring step in printing job memory unit; an authentication information acquiring step of acquiring authentication information; a usage-qualification determining step of determining a usage qualification of the printing job on the basis of the authentication information acquired in the authentication information acquiring step; an operating state controlling step of controlling a state of the printing device; a printing process completion detecting step of detecting completion of the printing process in the printing device; and a printing job transmitting step of transmitting the printing job determined to have a usage qualification in the usage-qualification determining step out of the printing jobs stored in the printing job memory unit to the printing device, wherein the operating state controlling step is adapted to issue a power-save-cancel command for causing the power-saving state to be changed into an active state to the printing device after having acquired the printing job, and issue a transition-to-power-save command for causing the state to be changed from the active state to the power-saving state to the printing device when the printing process of the printing job is completed is detected in the printing process completion detecting step.

In this arrangement, when the program is read by the computer and the computer executes processing according to the read program, the same effects and advantages as the printing device management device in Mode 18 are achieved.

Mode 30

In addition to the printing device management program in Mode 29, the printing device management program in Mode 30 further includes a program used for causing the computer to execute the processing including a set time information acquiring step of acquiring the set time information which corresponds to information of switching time preset in the destination printing device of the printing job after having acquired the printing job; a term-of-validity calculating step of acquiring time information after having the printing job and calculating the term of validity of the operating state for the printing job on the basis of the acquired time information and the set time information acquired in the set time information acquiring step; and an elapse observing step of acquiring the current time information and observing whether or not the current time is passed over the term of validity on the basis of the time information and the term of validity calculated in the term-of-validity calculating step, and wherein the operating state controlling step is adapted to issue the transition-to-power-save command for causing the state to be changed from the active state to the power-saving state to the destination printing device when the printing process of the printing job is completed or when the term of validity of the printing job is expired on the basis of the detected result in the printing process completion detecting step and the observed result in the elapse observing step, and to issue the switching-time-change command for causing the switching time which is currently set in the destination printing device of the printing job to be changed into the switching time indicated by the set time information corresponding to the printing job to the destination printing device.

In this arrangement, when the program is read by the computer and the computer executes the process according to the read program, the same effects and advantages as the printing device management device in Mode 19 are achieved.

Mode 31

In addition to the printing device management program in Mode 30, the printing device management program in Mode 31 further includes a program used for causing the computer to execute a term-of-validity updating step of updating the term of validity on the basis of the switching-time-changed in a switching time changing step, and wherein the operating state controlling step is adapted in such a manner that in a case in which the data storing unit has a plurality of printing jobs within the term of validity for the identical printing device stored therein, when the printing process of the printing job of any one of the plurality of stored printing jobs is completed or when the term of validity of any one of the printing jobs is expired on the basis of the detected result of the printing process completion detecting step and the observed result of the elapse observing step, the set time information corresponding to the printing job whose term of validity will be expired next is changed into the set time information corresponding to the printing job whose printing process is completed or whose term of validity is expired, and that the transition-to-power-save command for causing the state to be changed from the active state to the power-saving state is issued to the destination printing device and the switching-time-change command for causing the switching time which is currently set in the printing device to be changed into the set time information corresponding to the printing job whose printing process is completed lastly or the printing job whose term of validity is expired lastly is issued to the printing device when there is no more printing job within the term of validity left among the plurality of stored printing job.

In this arrangement, when the program is read by the computer and the computer executes the process according to the read program, the same effects and advantages as the printing device management device in Mode 20 are achieved.

Mode 32

On the other hand, in order to achieve the above-described object, a printing device control program in Mode 32 is a printing device control program to be used for controlling a printing device for executing a printing process on the basis of a printing job, including a program to be used for causing a computer to execute a process including: a print processing step of executing the printing process on the basis of the printing job which has a usage qualification out of the printing jobs stored in printing job memory unit; and a power-save switching step of switching a state of the printing device into either one of an active state in which the printing process to be performed in the print processing step is enabled and a power-saving state in which a drive power during a stand-by time for the printing process on the basis of either one of a command from an operating state controlling step of controlling the state of the printing device and an elapsed time from a switching time which corresponds to a stand-by time for the active state until the state of the printing device is switched from the active state to the power-saving state.

In this arrangement, when the program is read by the computer and the computer executes the process according to the read program, the same effects and advantages as the printing device in Mode 21 are achieved.

Mode 33

In order to achieve the above-described object, a printing device control program in Mode 33 is a printing device control program to be used for controlling a printing device for performing a printing process based on a printing job, including a program to be used for causing a computer to execute a process including a printing job receiving step of receiving the printing job, a print processing step of executing the printing process on the basis of the printing job received in the printing job receiving step; and a power-save switching step of switching a state of the printing device into either one of an active state in which the printing process to be performed by the print processing step is enabled and a power-saving state in which a drive power during a stand-by time for the printing process on the basis of either one of a command from an operating state controlling step of controlling the state of the printing device and an elapsed time from a switching time which corresponds to a stand-by time for the active state until the state of the printing device is switched from the active state to the power-saving state.

In this arrangement, when the program is read by the computer and the computer executes the process according to the read program, the same effects and advantages as the printing device in Mode 22 are achieved.

Mode 34

In addition to the printing device control program in Mode 32 or 33, the printing device control program in Mode 34 further includes a program to be used for causing the computer to executes a switching time changing step of changing the switching time preset in the printing device on the basis of a switching-time-change command from the operating state controlling step.

In this arrangement, when the program is read by the computer and the computer executes the process according to the read program, the same effects and advantages as the printing device in Mode 23 are achieved.

Mode 35

In addition to the printing device control program according to any one of Modes 32 to 34, the printing device control program in Mode 35 further includes a program to be used for causing the computer to executes a process including: printing job acquiring step of acquiring the printing job; printing job storing step of storing the printing job acquired in the printing job acquiring step in the printing job memory unit; authentication information acquiring step of acquiring authentication information; usage-qualification determining steps for determines a usage qualification of the printing job on the basis of the authentication information acquired in the authentication information acquiring step; the operating state controlling step of controlling a state of the printing device, and wherein the operating state controlling step is adapted to issue a power-save-cancel command for causing the power-saving state to be changed into the active state to the power-save switching step after having acquired the printing job, and a transition-to-power-save command for causing the state to be changed from the active state to the power-saving state to the power-save switching step when the printing process of the printing job is completed is detected in the printing process completion detecting step.

In this arrangement, when the program is read by the computer and the computer executes the process according to the read program, the same effects and advantages as the printing device in Mode 24 are achieved.

Mode 36

In addition to the printing device control program in Mode 35, the printing device control program in Mode 36 further includes a program to be used for causing the computer to execute a process further includes: set time information acquiring step of acquiring the set time information as the information on the switching time preset in the destination printing device after having acquired the printing job; term-of-validity calculating step of calculating the time information after having acquired the printing job and calculating the term of validity of the active state for the printing job on the basis of the acquired time information and the set time information acquired by the set time information acquiring unit, and elapse observing step of acquiring the current time information and observing whether or not the current time passes over the term of validity on the basis of the time information and the term of validity calculated by the term-of-validity calculating steps, and wherein the operating state controlling step is adapted to issue the transition-to-power-save command for causing the state to be changed from the active state to the power-saving state to the power-save switching step when the printing process of the printing job is completed or when the term of validity of the printing job is expired on the basis of the detection result of the printing process completion detecting steps and the observed result of the elapse observing steps, and to issue the switching-time-change command for causing the switching time which is currently set in the printing device to be changed into the switching time indicated by the set time information corresponding to the printing job to the switching time changing step.

In this arrangement, when the program is read by the computer, and the computer executes the process according to the read program, the same effects and advantages as the printing device in Mode 25 are achieved.

Mode 37

In addition to the printing device control program in Mode 36, the printing device control program in Mode 37 further includes a program to be used for causing the computer to execute a term-of-validity updating step of updating the term of validity on the basis of the switching-time-changed in the switching time changing step, and wherein the operating state controlling step is adapted in such a manner that in a case in which the data memory unit has a plurality of printing jobs within the term of validity, when the printing process of the printing job of any one of the plurality of stored printing jobs is completed or when the term of validity of any one of the printing job is expired on the basis of the detected result in the printing process completion detecting step and the observed result in the elapse observing step, the set time information corresponding to the printing job whose term of validity will be expired next is changed into the set time information corresponding to the printing job whose printing process is completed or whose term of validity is expired, and that the transition-to-power-save command for causing the state to be changed from the active state to the power-saving state is issued to the power-save switching step and the switching-time-change command for causing the switching time which is currently set in the printing device to be changed into the set time information corresponding to the printing job whose printing process is completed lastly or the printing job whose term of validity is expired lastly is issued to the switching time changing step when there is no more printing job within the term of validity left among the plurality of stored printing job.

In this arrangement, when the program is read by the computer and the computer executes the process according to the read program, the same effects and advantages as the printing device in Mode 26 are achieved.

Mode 38

On the other hand, in order to achieve the above-described object, a printing method in Mode 38 is a printing method having a printing device for executing a printing process on the basis of a printing job so that the printing device executes the printing process after having acquired authentication including: printing job acquiring step of acquiring the printing job; printing job storing step of storing the printing job acquired in the printing job acquiring step in printing job memory unit; authentication information acquiring step of acquiring authentication information; usage-qualification determining step of determining a usage qualification of the printing job on the basis of the authentication information acquired in the authentication information acquiring step; operating state controlling step of controlling a state of the printing device; printing process completion detecting step of detecting completion of the printing process in the printing device; a power-save switching step of switching a state of the printing device into either one of an active state in which the printing process to be performed in the print processing step is enabled and a power-saving state in which a drive power during a stand-by time for the printing process on the basis of either one of a command from the operating state controlling step and an elapsed time from a switching time which corresponds to a stand-by time for the active state until the state of the printing device is switched from the active state to the power-saving state, wherein the operating state controlling step is adapted to issue a power-save-cancel command for causing the power-saving state to be changed into the active state to the power-save switching step after the device for executing the printing job storing step has acquired the printing job, and a transition-to-power-save command for causing the state to be changed from the active state to the power-saving state to the power-save switching step when the printing process of the printing job is completed is detected in the printing process completion detecting step.

Accordingly, the same effects as the printing system in Mode 8 are achieved.

This method here can be achieved by a network system in which the printing device is connected to other devices, terminals, equipment, and so on so as to be capable of mutual communication. In this case, the printing job acquiring step, the printing job storing step, the authentication information acquiring step, the usage-qualification determining step, the operating state controlling step, and the printing process completion detecting step may be executed in any of the printing device and other equipment. It is also applicable to the printing method in Mode 39.

Mode 39

In order to achieve the above-described object, a printing method in Mode 39 is a printing method in which a print instruction issuing device for executing a print instruction issuing process of a printing job is connected to a printing device for executing a printing process on the basis of the printing job so as to be capable of mutual data communication, and the printing device executes the printing process after having acquired the authentication, including:

a printing job acquiring step of acquiring the printing job; a printing job storing step of storing the printing job acquired in the printing job acquiring step in printing job memory unit; an authentication information acquiring step of acquiring authentication information; an usage-qualification determining step of determining a usage qualification of the printing job on the basis of the authentication information acquired in the authentication information acquiring step; an operating state controlling step of controlling a state of the printing device; and a printing process completion detecting step of detecting completion of the printing process in the printing device, the printing device including a print processing step of executing the printing process on the basis of the printing job which has determined to have the usage qualification out of the printing jobs stored in the printing job memory unit in the usage qualification determining step; and a power-save switching step of switching a state of the printing device into either one of an active state in which the printing process to be performed in the print processing step is enabled and a power-saving state in which a drive power during a stand-by time for the printing process is reduced on the basis of either one of a command from the operating state controlling step and an elapsed time from a switching time which corresponds to a stand-by time for the active state until the state of the printing device is switched from the active state to the power-saving state, wherein the operating state controlling step is adapted to issue a power-save-cancel command for causing the power-saving state to be changed into the active state to the power-save switching step after the device for executing the printing job storing step has acquired the printing job, and a transition-to-power-save command for causing the state to be changed from the active state to the power-saving state to the power-save switching step when the printing process of the printing job is completed is detected in the printing process completion detecting step.

Accordingly, the same effects as the printing system in Mode 9 are achieved.

Mode 40

In the printing method in Mode 38 or 39, a power-save authenticating method in Mode 40 includes: the print instruction issuing device for executing the print instruction for the printing job being connected to the device for executing the printing job storing step, and wherein:

the print instruction issuing device includes a print instruction issuing step of transmitting the printing job to the device that executes the printing job storing step corresponding to the destination printing device of the printing job and a switching-time-change instruction issuing step of issuing an instruction to change the switching time preset in the printing device;

the printing device includes the switching time changing step of changing the switching time preset in the printing device on the basis of the switching-time-change command from the operating state controlling step, and in that the operating state controlling step issues the switching-time change command to the switching time changing step according to the instruction from the switching-time-change instruction issuing step, and when the printing process of the printing job corresponding to the printing device whose switching time is changed is completed is detected in the printing process completion detecting step or when the switching time after change is elapsed, issues the switching-time-change command for restoring the switching time currently set in the destination printing device into the switching time before change to the switching time changing step.

In this arrangement, the same effects as the printing system in Mode 10 are achieved.

Mode 41

In addition, in the printing method in any one of Modes 38 to 40, the method in Mode 41 includes: the printing device management device for managing the printing device being connected to the printing device so as to be capable of mutual data communication, and wherein the printing device management device includes;

the printing job acquiring step; the printing job storing step; the authentication information acquiring step; the usage-qualification determining step; the operating state controlling step; the printing process completion detecting step; and the printing job transmitting step of transmitting the printing job determined to have the usage qualification in the usage-qualification determining step out of the printing jobs stored in the printing job memory unit to the printing device, the printing device includes a printing job receiving step of receiving the printing job, and the printing process is executed in the print processing step on the basis of the printing job received in the printing job receiving step.

Accordingly, the same effects as the printing system in Mode 11 are achieved.

Mode 42

A printing method of Mode 42 is according to the printing method in any one of Modes 38 to 40, wherein the printing device includes the printing job acquiring step; the printing job storing step; the authentication information acquiring step; the usage-qualification determining step; the operating state controlling step; and the printing process completion detecting step.

Accordingly, the same effects as the printing system in Mode 12 are achieved.

Mode 43

In the printing method in any one of Modes 40 to 42, the printing method in Mode 43 includes a set time information acquiring step of acquiring the set time information which corresponds to information of the switching time preset in the destination printing device of the printing job by the device that executes the printing job storing step after having acquired the printing job; a term-of-validity calculating step of acquiring the time information after having acquired the printing job and calculating the term of validity of the operating state for the printing job on the basis of the acquired time information and the set time information acquired in the set time information acquiring step by the device that executes the printing job storing step; and an elapse observing step of acquiring the current time information and observing whether or not the current time is passed over the term of validity on the basis of the time information and the term of validity calculated in the term-of-validity calculating step, wherein the operating state controlling step is adapted to issue the transition-to-power-save command for causing the state to be changed from the active state to the power-saving state when the printing process of the printing job is completed or when the term of validity of the printing job is expired on the basis of the detected result in the printing process completion detecting step and the observed result in the elapse observing step, and to issue the switching-time-change command for causing the switching time which is currently set in the destination printing device of the printing job to be changed into the switching time indicated by the set time information corresponding to the printing job to the switching-time changing step.

In this arrangement, the same effects as the printing system in Mode 13 are achieved.

Mode 44

In the printing method in Mode 43, the printing method in Mode 44 includes a term-of-validity updating step of updating the term of validity on the basis of the switching-time-changed in the switching time changing step, and wherein the operating state controlling step is adapted in such a manner that in a case in which the data storing unit has a plurality of printing jobs within the term of validity for the identical printing device stored therein, when the printing process of any one of the plurality of stored printing jobs is completed or when the term of validity of any one of the printing jobs is expired on the basis of the detected result of the printing process completion detecting step and the observed result of the elapse observing step, the set time information corresponding to the printing job whose term of validity will be expired next is changed into the set time information corresponding to the printing job whose printing process is completed or whose term of validity is expired, and that the transition-to-power-save command for causing the state to be changed from the active state to the power-saving state is issued to the power-save switching unit and the switching-time-change command for causing the switching time which is currently set in the printing device to be changed into the set time information corresponding to the printing job whose printing process is completed lastly or the printing job whose term of validity is expired lastly is issued to the switching time changing step when there is no more printing job within the term of validity left among the plurality of stored printing jobs.

In this arrangement, the same effects as the printing system in Mode 14 are achieved.

Mode 45

A printing method of Mode 45 is according to the printing method in any one of Modes 40 to 44, wherein the upper limit of the switching time to be set is within the range between the 15 and 30 minutes.

Accordingly, the same effects as the printing system in Mode 15 are achieved.

BRIEF DESCRIPTION OF THE DRAWINGS

The invention will be described with reference to the accompanying drawings, wherein like numbers reference like elements.

FIGS. 19A and 19B are drawings showing a data structure of a printing job management table 420.

DESCRIPTION OF EXEMPLARY EMBODIMENTS

Figure 1:
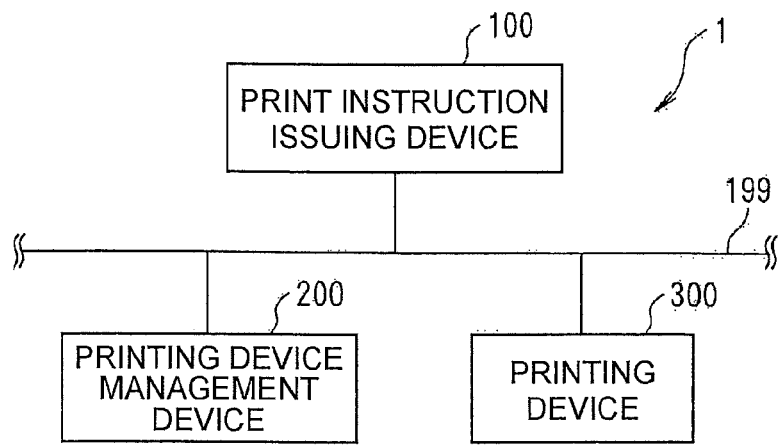
FIG. 1 is a drawing showing a schematic structure of a printing system according to the invention.

Referring now to the drawings, embodiments of the invention will be described. FIG. 1 to FIG. 20 are drawings showing the embodiments of a printing system, a print instruction issuing device, a printing device management device, a printing device, a print instruction issuing device control program, a printing device management program, a printing device control program, and a printing method.

Referring first to FIG. 1, a conceptual structure of the printing system according to the invention will be described. FIG. 1 is a drawing showing a conceptual structure of the printing system according to the invention.

As shown in FIG. 1, the printing system includes a print instruction issuing device 100 that performs a printing job generating process, a switching time setting process, a switching-time-change instruction issuing process and a printing job transmitting process, a printing device management device 200 that performs a printing job storing process, a user authentication process, a printing device state controlling process, a printing job activation term-of-validity observation process, authenticated printing job transmitting process, and a printing device 300 that performs a printing-job-based printing process, an own-state switching process, and a switching-time-change process, and the respective devices are connected to each other via a network 199 so as to be capable of data communication.

The term "switching time" in this specification designates a stand-by time until the printing device 300 automatically switches the state of the printing device 300 from an active state to a power-saving state when the printing device 300 is in the active state but no input is supplied thereto. In other words, the printing device 300 automatically switches its own state from the active state to the power-saving state when the period of no input reaches a preset switching time.

The term "active state" designates a state in a mode referred to as "stand-by mode" in general printer devices, and is a state in which a time (waiting time) from a moment when the printing device 300 receives a printing job until the printing process (image forming process) is started continues for a minimum period (it depends on the performance or the like of the printing device).

The power-saving state designates a state in a mode referred to as "sleep mode" or "low-power mode" in general printer devices, and is a state with the least power consumption (depending on the machine type, there are devices having two levels of power saving mode (for example, warming up mode/power saving mode)). However, the power-saving state needs a period for warming up the device in order to make transition to the active state in which the printing process can be started immediately, and hence a longer waiting time until starting the printing process is necessary in comparison with the active state correspondingly.

Figure 2:
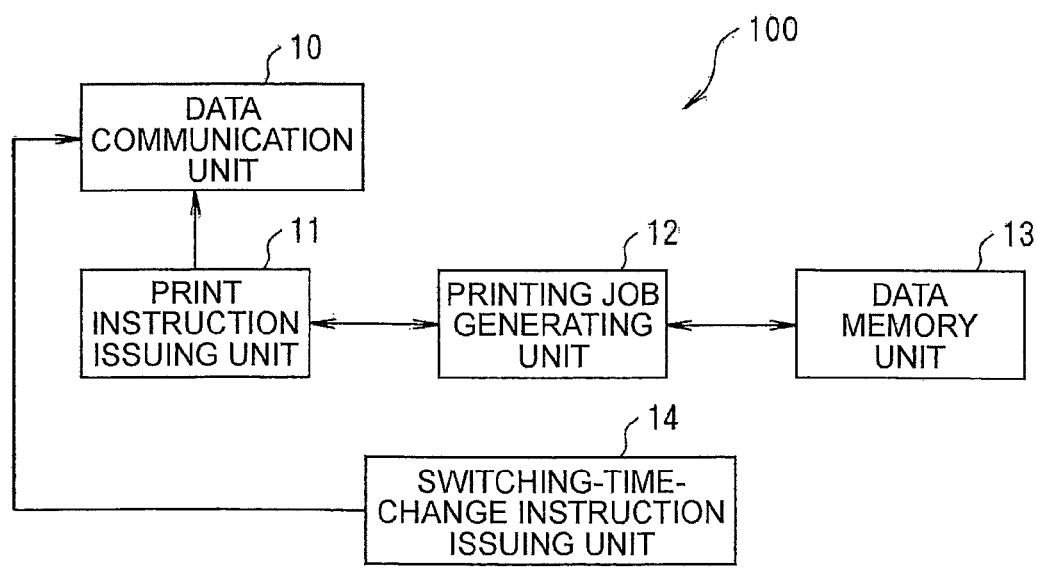
FIG. 2 is a block diagram showing a functional structure of a print instruction issuing device 100.

Referring now to FIG. 2, a detailed functional structure of the print instruction issuing device 100 will be described. FIG. 2 is a block diagram showing a functional structure of the print instruction issuing device 100.

As shown in FIG. 2, the print instruction issuing device 100 includes a data communication unit 10 that transmits and receives various data with the printing device management device 200 via a network 199, a print instruction issuing unit 11 that issues instruction to generate a printing job to a printing job generating unit 12, described later, and issues instruction to transmit the printing job to the data communication unit 10 upon reception of the print instruction from the user, the printing job generation unit 12 that, upon reception of the instruction from the print instruction issuing unit 11, reads printing data corresponding to the content of the instruction from a data memory unit 13, generates print request information including user information, print set information, and so on, and provides the generated print request information to the read-out printing data to generate the printing job, and a switching-time-change instruction issuing unit 14 that sets the switching time to switch the state of the printing device 300 from the active state to the power-saving state automatically and transmits a preset switching-time-change instruction information to the printing device management device 200 via the data communication unit 10.

Figure 3:
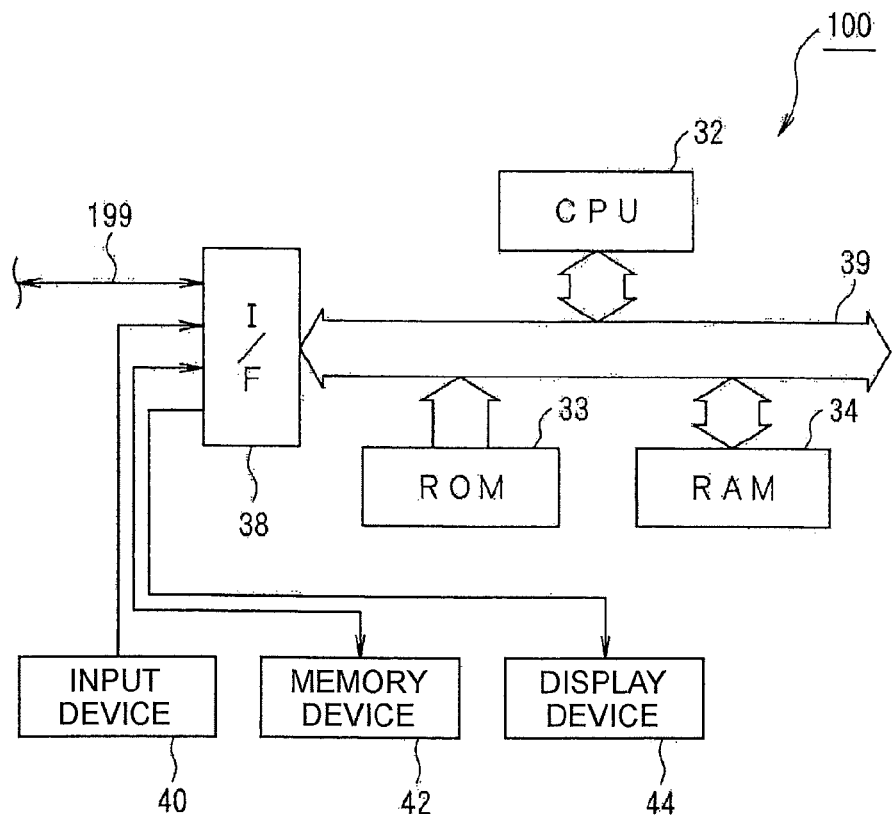
FIG. 3 is a block diagram showing a hardware structure of the print instruction issuing device 100.

Subsequently, a hardware structure of the print instruction issuing device 100 will be described on the basis of FIG. 3. FIG. 3 is a block diagram showing the hardware structure of the print instruction issuing device 100.

As shown in FIG. 3, the print instruction issuing device 100 includes a CPU 32 that executes calculation on the basis of a control program and control of the entire system, a ROM 33 in which the control program of the CPU 32 or the like is stored in a predetermined area, a RAM 34 that stores data read out from the ROM 33 or the like and necessary results of calculation in the course of calculation in the CPU 32, and an I/F 38 that serves as a medium through which input and output of data with respect to the external device is transmitted. These members are connected to each other so as to be capable of receiving and transmitting data via a bus 39 as a signal line for the transmitting data.

The I/F 38 is connected to external devices such as an input device 40 which can input data as a human interface such as a keyboard or a mouse, a memory device 42 in which data or table is stored as a file therein, a display device 44 that displays images such as a switching time setting screen on the basis of the image signals, and a signal line for connecting with a network 199.

Figure 4:
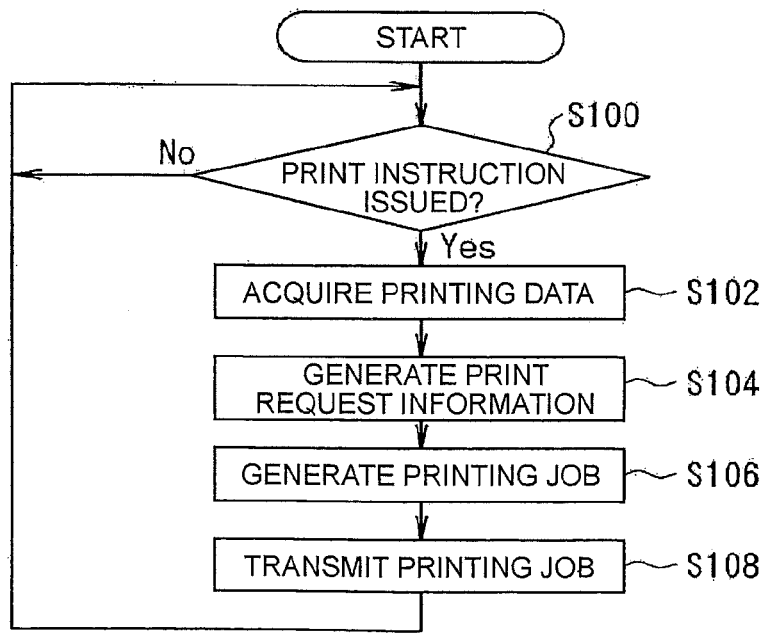
FIG. 4 is a flowchart showing a print request process.

The CPU 32 is composed of a micro-processing unit and the like, and activates a predetermined program stored in the predetermined area in the ROM 33 and executes a print request process shown in FIG. 4 according to the program.

FIG. 4 is a flowchart showing a print request process.

The print request process is a process to generate a printing job according to an instruction from the user, perform the switching time setting process according to the instruction from the user, add preset switching time information to the generated printing job, and transmit the printing job added with the switching time to the printing device management device 200 that manages the destination printing device 300. When this process is executed by the CPU 32, the procedure goes to Step S100 as shown in FIG. 4.

In Step S100, whether or not a print instruction is issued from the user via the input device 40 and an application software such as a document editor is determined at the print instruction issuing unit 11. If it is determined that the print instruction is issued (Yes), a printing job generation instruction is issued to the printing job generating unit 12, and the procedure goes to Step S102. If not (No), the determination process is continued until a print instruction is issued.

When the step goes to Step S102, in response to the printing job generation instruction from the print instruction issuing unit 11, the printing job generating unit 12 acquires printing data corresponding to the generation instruction from the data memory unit 13 and the procedure goes to Step S104.

In Step S104, the printing job generating unit 12 acquires the user information, information on the destination printing device, the print set information, and so on from the data memory unit 13 or via the application software, generates the print request information from the acquired information, and the procedure goes to Step S106.

In Step S106, the printing job generating unit 12 generates a printing job by adding the request information generated in Step S104 to the printing data acquired in Step S102, and then the procedure goes to Step S108.

In Step S108, the print instruction issuing unit 11 transmits the printing job generated in Step S106 to the printing device management device 200 that manages the destination printing device 300 via the data communication unit 10, and the procedure goes to Step S100.

Figure 5:
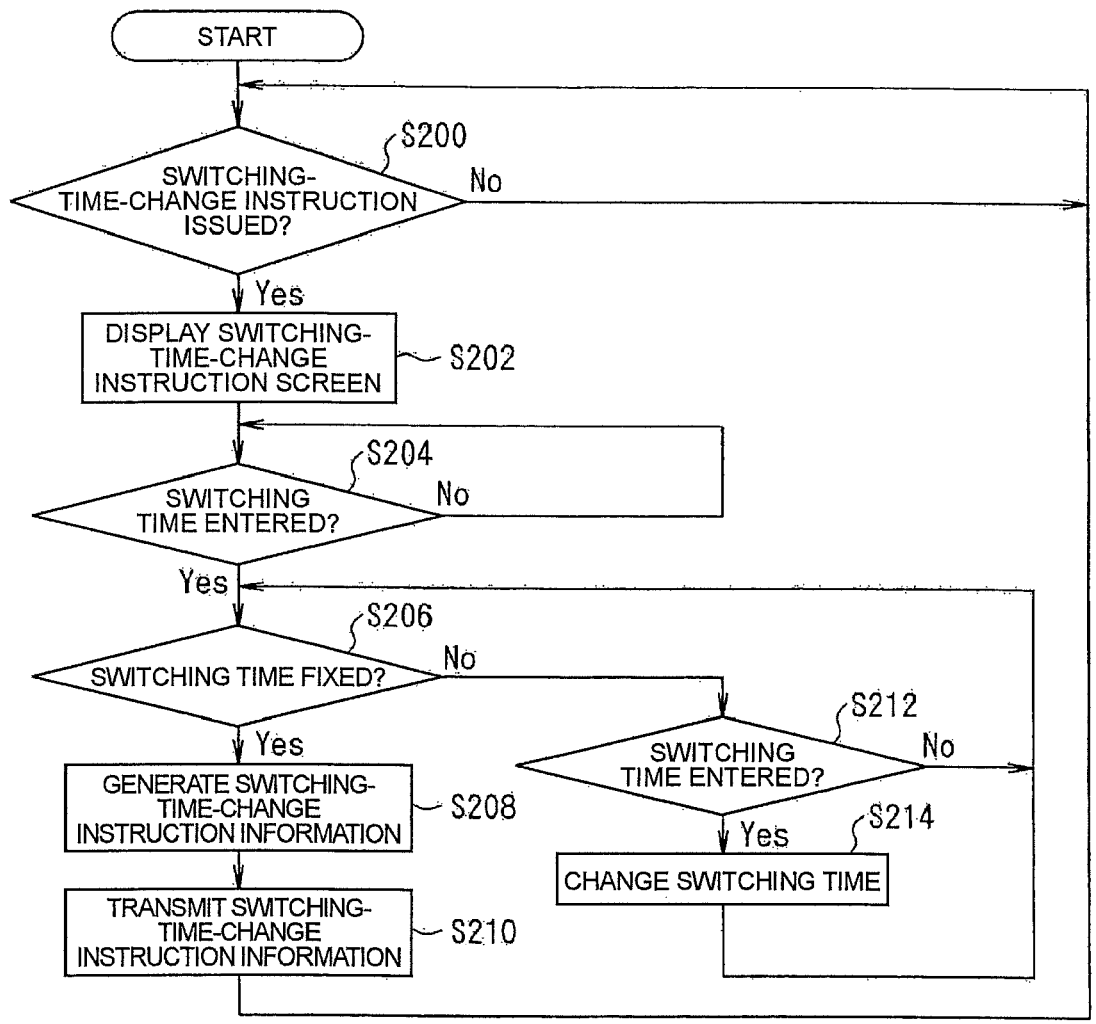
FIG. 5 is a flowchart showing a switching time setting process.

The CPU 32 activates a predetermined program stored in a predetermined area in the ROM 33, and executes the switching-time-change instruction issuing process shown in FIG. 5 according to the program.

FIG. 5 is a flowchart showing the switching-time-change instruction issuing process.

The switching-time-change instruction issuing process is a process to set a switching time by the switching-time-change instruction issuing unit 14 according to an instruction from the user via the input device 40 and transmit information on switching-time-change instruction for the preset switching time to the printing device management device 200. When this process is executed in the CPU 32, the procedure first goes to Step S200 as shown in FIG. 5.

In Step S200, whether or not the switching-time-change instruction is issued from the user via the input device 40 is determined in the switching-time-change instruction issuing unit 14, and when it is determined that the change instruction is issued (Yes), the procedure goes to Step S202, and if not (No), the determination process is continued until the change instruction is issued. The change instruction here includes information which specifies the printing device 300 to be changed.

When the procedure goes to the Step S202, the switching-time-change instruction issuing unit 14 displays a screen on which the user sets the switching time or issues the change instruction on the display device 44, and the procedure goes to Step S204.

In Step S204, the switching-time-change instruction issuing unit 14 determines whether or not the switching time is inputted by the user via the input device 40, and when it is determined that it is inputted (Yes), the procedure goes to the step S206, and if not (No), the process goes to the step S208.

When the procedure goes to Step S206, the switching-time-change instruction issuing unit 14 determines whether or not a switching time settlement instruction is issued by the user via the input device 40, and if it is determined that it is issued (Yes), the procedure goes to Step S208, and if not (No), the procedure goes to Step S212.

When the procedure goes to Step S208, the switching-time-change instruction issuing unit 14 generates the switching-time-change instruction information for causing the printing device management device 200 to output the switching-time-change command to the printing device 300 to be changed on the basis of the switching time that is instructed to be settled in Step S206, and the procedure goes to Step S210. The switching-time-change instruction information here includes the printing device to be changed and the settled switching time information.

In Step S210, the switching-time-change instruction issuing unit 14 issues the switching-time-change instruction information generated in Step S208 to the printing device management device 200 via the data communication unit 10, and the procedure goes to Step S200.

On the other hand, when the switching time settlement instruction is not issued in Step S206 and the procedure goes to Step S212, the switching-time-change instruction issuing unit 14 determines whether the switching time is inputted by the user via the input device 40, and if it is determined to be inputted (Yes), the procedure goes to Step S214, and if not (No), the procedure goes to Step S206.

When the procedure goes to Step S214, the switching-time-change instruction issuing unit 14 changes the inputted unsettled switching time into the switching time inputted in Step S212, and the procedure goes to Step S206.

Figure 6:
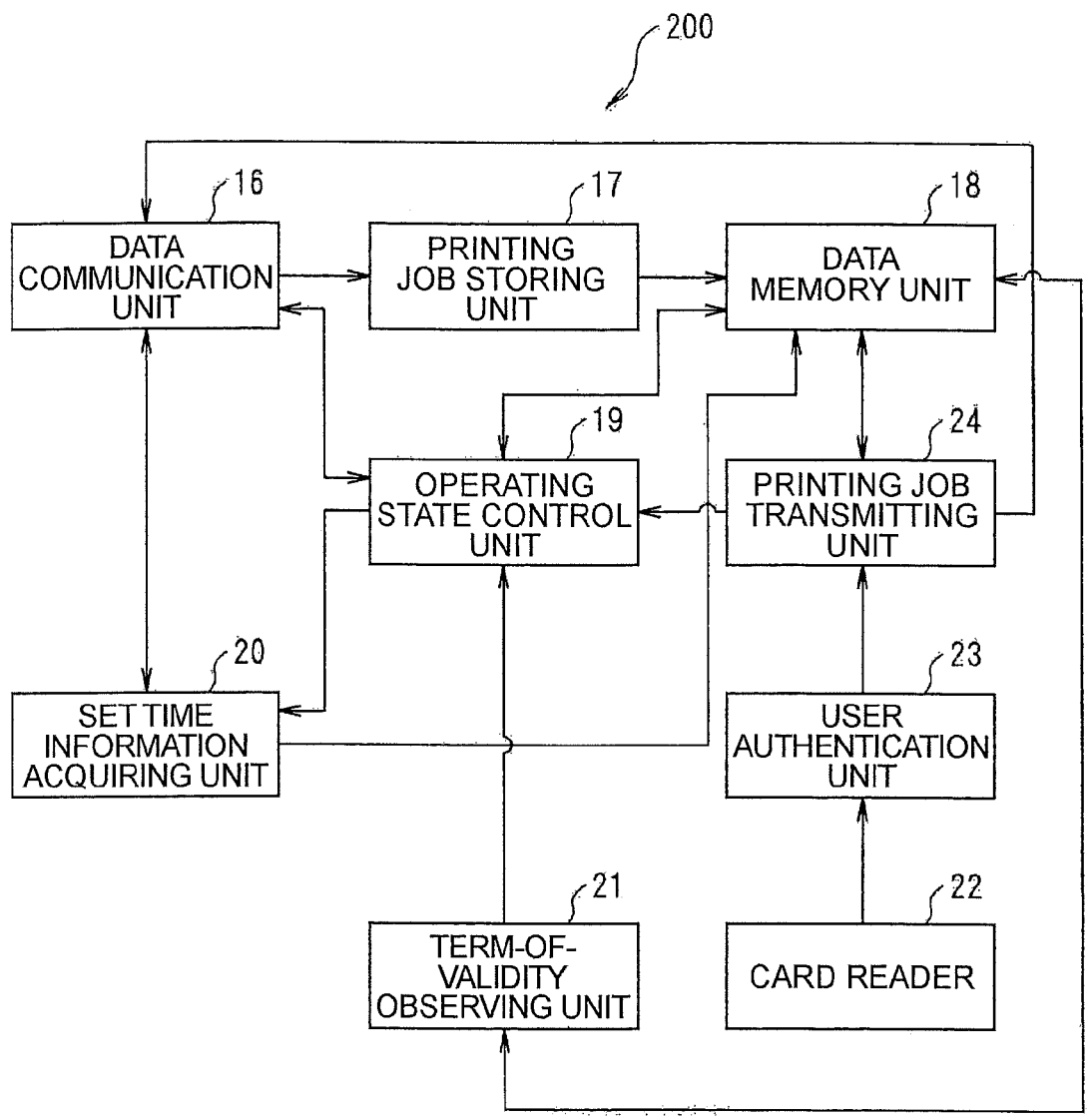
FIG. 6 is a block diagram showing a functional structure of a printing device management device 200.

Furthermore, referring now to FIG. 6, a detailed functional structure of the printing device management device 200 will be described. FIG. 6 is a block diagram showing the functional structure of the printing device management device 200.

As shown in FIG. 6, the printing device management device 200 includes a data communication unit 16 that transmits and receives various data with respect to the print instruction issuing device 100 and the printing device 300 via he network 199, a printing job storing unit 17 that acquires the printing job via the data communication unit 16 and storing the acquired printing job in a data memory unit 18, and a printing data memory unit 18.

The printing device management device 200 further includes an operating state control unit 19 that executes a process of generating information on an operation term of validity of the printing job stored in the data memory unit 18 and a state controlling process for the printing device 300, a set time information acquiring unit 20 that executes a process of acquiring set time information set in the printing device 300 from the printing device 300, and a term-of-validity observing unit 21 that observes the operation term of validity of the printing job stored in the data memory unit 18.

The printing device management device 200 further includes a card reader 22 that reads authentication information written in an IC card memory, a user authentication unit 23 that executes a user authentication process on the basis of first authentication information read by the card reader 22, and second authentication information stored in a memory device 62 described later, and a printing job transmitting unit 24 that selects the printing job of the user authenticated by the user authentication unit 23 from the data memory unit 18 and executes a process of transmitting the selected printing job to the destination printing device 300 via the data communication unit 16. The first authentication information includes the user information and user-specific information such as a password, and the second authentication information is information to be collated with the first authentication information, and includes a information table in which the user information and the user-specific information such as the password are stored for the users having usage qualification.

Subsequently, the hardware structure of the printing device management device 200 will be described.

Figure 7:
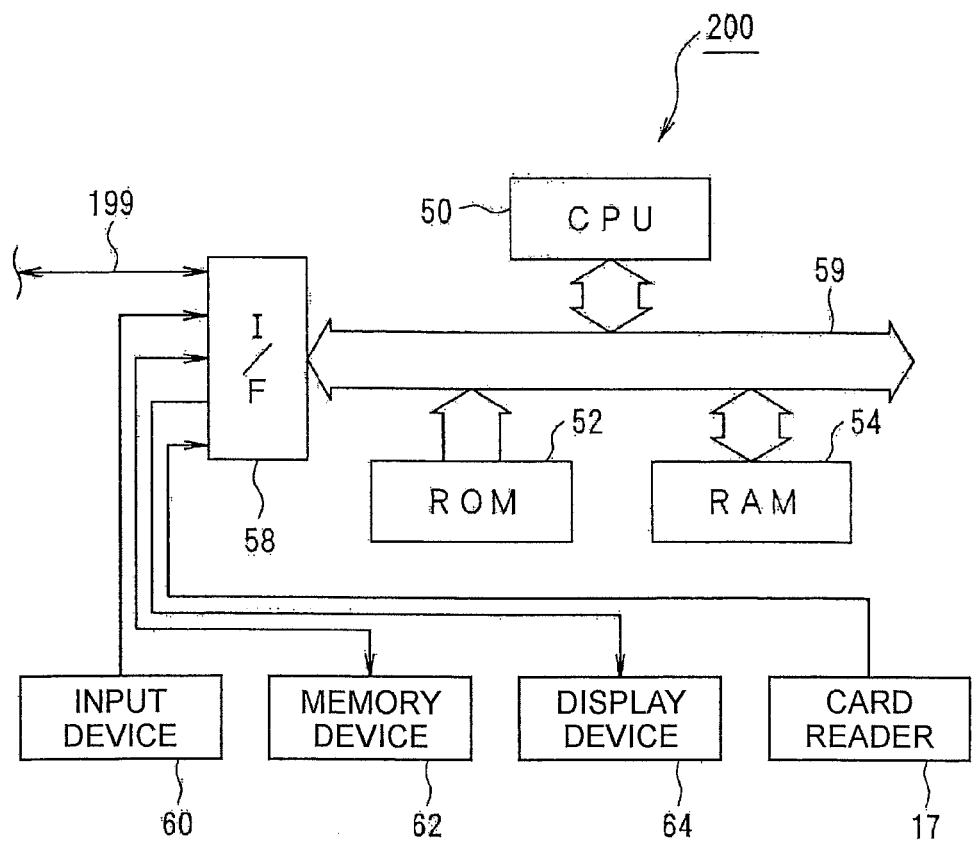
FIG. 7 is a block diagram showing a hardware structure of the printing device management device 200.

FIG. 7 is a block diagram showing a hardware structure of the printing device management device 200.

As shown in FIG. 7, the printing device management device 200 includes a CPU 50, a ROM 52, a RAM 54 and an I/F 58 connected by a bus 59, and signal lines for connecting an input device 60, the memory device 62, and a display device 64, and the network 199 are connected to the I/F 58 like the print instruction issuing device 100. The printing device control device 200 has a structure in which the card reader 22 described above is connected to the I/F 58 as an external device.

The CPU 50 includes a micro-processing unit or the like, activates a predetermined program stored in the predetermined area of the ROM 52, and executes a printing job storing process, a state controlling process, an authentication and print instruction issuing process, and a term-of-validity managing process shown in flowcharts in FIG. 8, FIG. 9, FIG. 10 and FIG. 11, respectively according to the program.

The printing job storing process will be described first.

Figure 8:
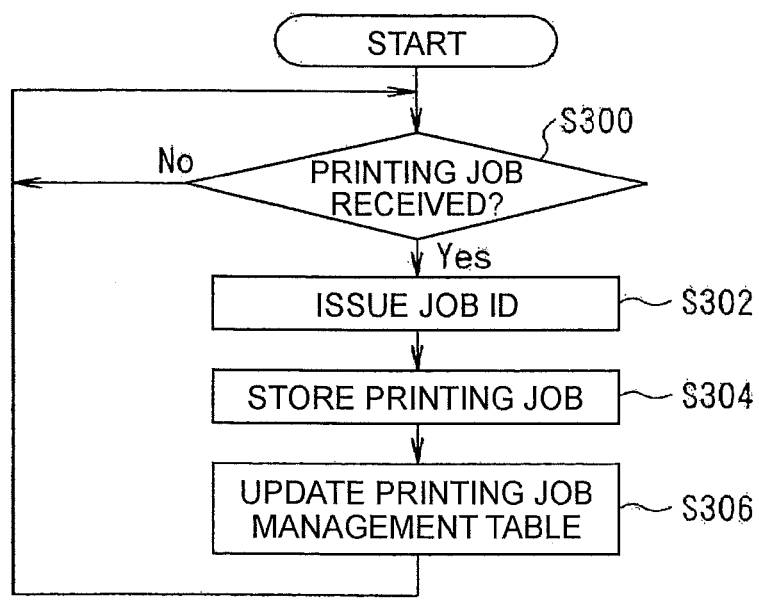
FIG. 8 is a flowchart showing a printing job storing process.

FIG. 8 is a flowchart showing the printing job storing process.

The printing job storing process is a process for storing the printing job from a host terminal 100. When this process is executed by the CPU 50, as shown in FIG. 8, the procedure first goes to Step S300.

In Step S300, the printing job storing unit 17 determines whether or not the printing job is received via the data communication unit 16, and when it is determined to be received (Yes), the procedure goes to Step S302, and if not (No), the determination process is continued until it is received.

When the procedure goes to Step S302, the printing job storing unit 17 issues a job ID to the printing job received in Step S300 and the procedure goes to Step S304.

In Step S304, the printing job received in Step S300 is stored in the data memory unit 18 of the memory device 62, and the procedure goes to Step S306.

In Step S306, the file name of the printing data, the print request information and the switching time information are acquired from the received printing job, a new record including the issued job ID, the acquired file name, the acquired print request information, and the acquired switching time information is registered in the printing job management table, and the procedure goes to Step S300.

Subsequently, the state controlling process will be described.

Figure 9:
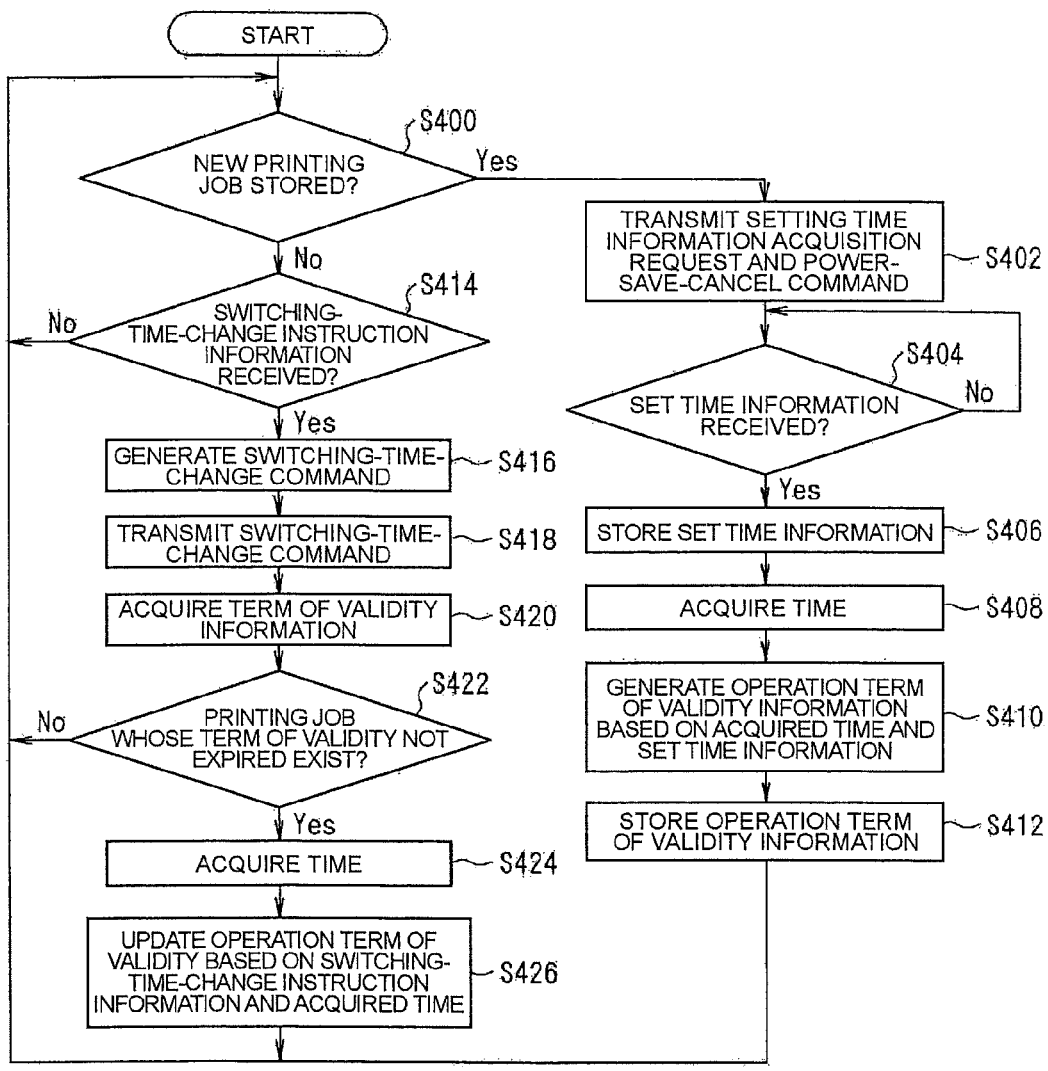
FIG. 9 is a flowchart showing an operation term of validity information generating process.

FIG. 9 is a flowchart showing the operation term of validity information generating process.

The state controlling process is a process for controlling the state of the destination printing device 300 and a switching time when switching from the active state to the power-saving state. When this process is executed by the CPU 50, as shown in FIG. 9, the procedure goes first to Step S400.

In Step S400, the operating state control unit 19 determines whether or not a new printing job is stored in the data memory unit 18, and when it is determined to be stored (Yes), the time information acquisition instruction is transmitted to the set time information acquiring unit 20 and the procedure goes to Step S402. If not (No), the procedure goes to Step S414.

When the procedure goes to Step S402, the operating state control unit 19 issues a power-save-cancel command to the printing device 300 via the data communication unit 16, and the set time information acquiring unit 20 issues a set time information acquisition request for acquiring the set time information from the printing device 300 to the printing device 300 via the data communication unit 16 according to the instruction from the operating state control unit 19, and the procedure goes to Step S404.

The set time information in this specification represents the switching time information which is currently set in the printing device 300.

In Step S404, the set time information acquiring unit 20 determines whether or not the set time information is received from the printing device 300 via the data communication unit 16. When it is determined to be received (Yes), the received information is transmitted to the operating state control unit 19 and the procedure goes to Step S406, and if not (No), the determination process is continued until it is received.

In Step S406, the operating state control unit 19 stores the set time information acquired from the set time information acquiring unit 20 in the data memory unit 18 in coordination with the printing job, and the procedure goes to Step S408.

In Step S408, the operating state control unit 19 acquires the current time from a clock function, not shown, and the procedure goes to Step S410.

In Step S410, the operating state control unit 19 generates operation term of validity information for the printing job corresponding to the set time information on the basis of the time acquired in Step S408 and the set time information stored in Step S406 and the procedure goes to Step S412. In this case, the operation term of validity information is information indicating a term of validity that the printing device 300 maintains the active state for the printing job stored in the data memory unit 18.

In Step S412, the operating state control unit 19 stores the operation term of validity information generated in Step S410 in the data memory unit 18 in coordination with the printing job and the procedure goes to Step S400.

On the other hand, when the procedure goes to Step S414, the operating state control unit 19 determines whether or not the switching-time-change instruction information is received from the print instruction issuing device 100. When it is determined to be received (Yes), the procedure goes to Step S416. If not (No), the procedure goes to Step S400.

When the procedure goes to Step S416, the operating state control unit 19 generates a switching-time-change command on the basis of the switching-time-change instruction information received in Step S414 and the procedure goes to Step S418. The switching-time-change command here includes information on the switching time set by the user, and the printing device 300 changes the set switching time into the switching time included in the switching-time-change command on the basis of the switching time information.

In Step S418, the operating state control unit 19 issues the switching-time-change command generated in Step S416 to the printing device 300 to be changed via the data communication unit 16 and the procedure goes to Step S420.

In Step S420, the operating state control unit 19 acquired term of validity information of the printing job corresponding to the printing device 300 to be changed in switching time from the data memory unit 18 and the procedure goes to Step S422.

In Step S422, the operating state control unit 19 determines whether or not there exists a printing job whose term of validity is not expired on the basis of the acquired result of the term of validity information in Step S420. If it is determined to exist (Yes), the procedure goes to Step S424, and if not (No), the procedure goes to Step S400.

When the procedure goes to Step S424, the operating state control unit 19 acquires the current time from the clock function, not shown, and the procedure goes to Step S426.

In Step S426, the operating state control unit 19 updates the term of validity of the printing job whose term of validity is not expired on the basis of the switching-time-change instruction information received in Step S414 and the time acquired in Step S424, and the procedure goes to Step S400. In other words, when the switching time is changed by the switching-time-change command, the active state continues until the switching time after having changed is elapsed in the printing device 300, and hence the term of validity information of the printing job whose term of validity is not expired is updated correspondingly.

Subsequently, the authentication and print instruction issuing process will be described.

Figure 10:
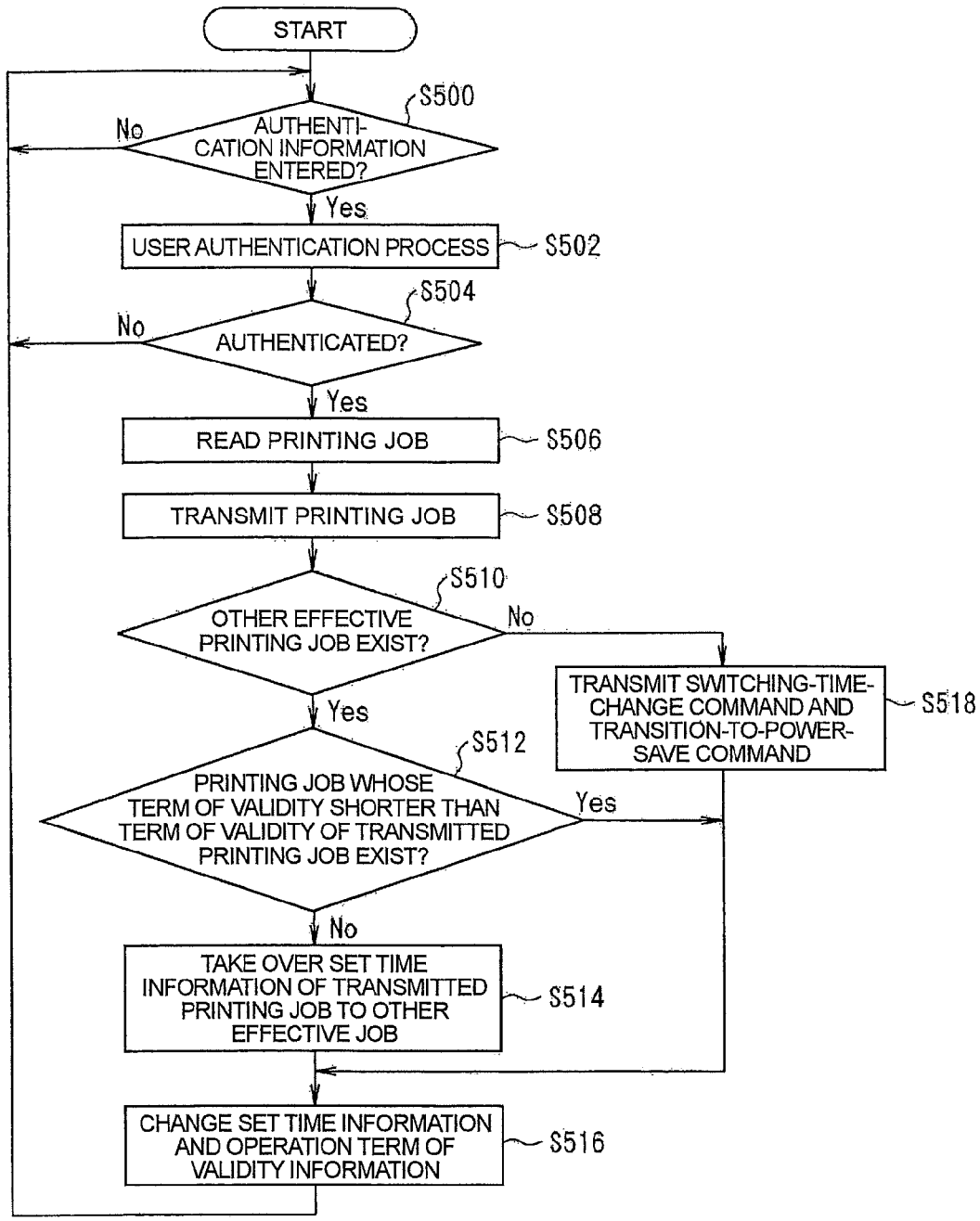
FIG. 10 is a flowchart showing an authentication and print instruction issuing process.

FIG. 10 is a flowchart showing the authentication and print instruction issuing process.

The authentication and print instruction issuing process is a process to execute an authentication process on the basis of the first authentication information acquired via the card reader 22, transmit a printing job of an authenticated user to the printing device 300, and execute a succession process of the set time information. When this process is executed by the CPU 50, the procedure goes to Step S500 first as shown in FIG. 10.

In Step S500, the user authentication unit 23 determines whether or not the first authentication information is input is determined via the card reader 22. When it is determined to be inputted (Yes), the procedure goes to Step S502, and if not (No), the determination process is continued until it is inputted.

When the procedure goes to Step S502, the user authentication unit 23 determines whether or not the user is authenticated by determining whether or not there exists the user information corresponding to the first authentication information in the second authentication information on the basis of the first authentication information inputted via the card reader 22 and the second authentication information stored in the data memory unit 18. If it is determined to be authenticated (Yes), information of the authenticated user is transmitted to the printing job transmitting unit 24 and the procedure goes to Step S506. If not (No), the procedure goes to Step S500. In other words, when information which coincides with the first authentication information, the user is authenticated, and if not, the user is not authenticated.

When the procedure goes to Step S506, the printing job transmitting unit 24 selects and read out the corresponding printing job from the data memory unit 18 based on the user information from the user authentication unit 23, and the procedure goes to Step S508.

In Step S508, the printing job transmitting unit 24 transmits the printing job read out in Step S506 to the printing device 300 via the data communication unit 16, and gives the notice that the printing job is transmitted to the operating state control unit 19, and the procedure goes to Step S510. Here, in this embodiment, the printing job transmitting unit 24 is adapted to transmit a copy of the printing job to the printing device 300, and store the printed printing job in the data memory unit 18 for a predetermined duration.

In Step S510, the operating state control unit 19 determines whether or not an effective printing job whose operation term of validity is not expired is stored in the data memory unit 18 in addition to the printing job transmitted in Step S508 according to the notice from the printing job transmitting unit 24. If it is determined to be stored (Yes), the procedure goes to Step S512, and if not (No), the procedure goes to Step S518.

When the procedure goes to Step S512, the operating state control unit 19 determines whether or not there exists a printing job whose term of validity is shorter than the term of validity of the printing job transmitted in Step S508 on the basis of the printing job set time information transmitted in Step S508 and the set time information of the respective effective printing jobs stored in the data memory unit 18. If it is determined to exist (Yes), the procedure goes to Step S516, and if not (No), the procedure goes to Step S514.

When the procedure goes to Step S514, the operating state control unit 19 changes the set term information corresponding to the printing job whose operation term of validity is effective into the set time information corresponding to the printing job transmitted in Step S508 (succession of the set time information), and the procedure goes to Step S516.

When the procedure goes to Step S516, the operating state control unit 19 changes the print set information and the operation term of validity information into the information indicating that it is not an object of control (for example, NULL), which corresponds to the printing job which is transmitted from the data memory unit 18 in Step S508 and the procedure goes to Step S500. In this embodiment, the printing job whose print set information and operation term of validity information are NULL is precluded from the object of control. It is also possible not to change the information into the information indicting that it is not an object of control, and delete the set time information and the operation term of validity information to check it off from the object of control.

On the other hand, when no other effective printing job is stored in Step S510, and the procedure goes to Step S518, the switching-time-change command for causing the switching time which is currently set in the printing device 300 to be changed into the switching time shown by the set time information corresponding to the printing job transmitted in Step S508 is generated, and the switching-time-change command and transition-to-power-save command are transmitted to the printing device 300 via the data communication unit 16, and the procedure goes to Step S516. Here, the transition-to-power-save command is a command to cause the printing device 300 to be switched from the active state to the power-saving state when the printing device 300 is in the active state. In other words, since there is no printing job whose operation term of validity is not expired in the data memory unit 18, the printing device 300 which is currently active state is caused to be switched to the power-saving state, and the changed switching time is returned to the switching time preset for the printing device 300.

Subsequently, the term-of-validity managing process will be described.

Figure 11:
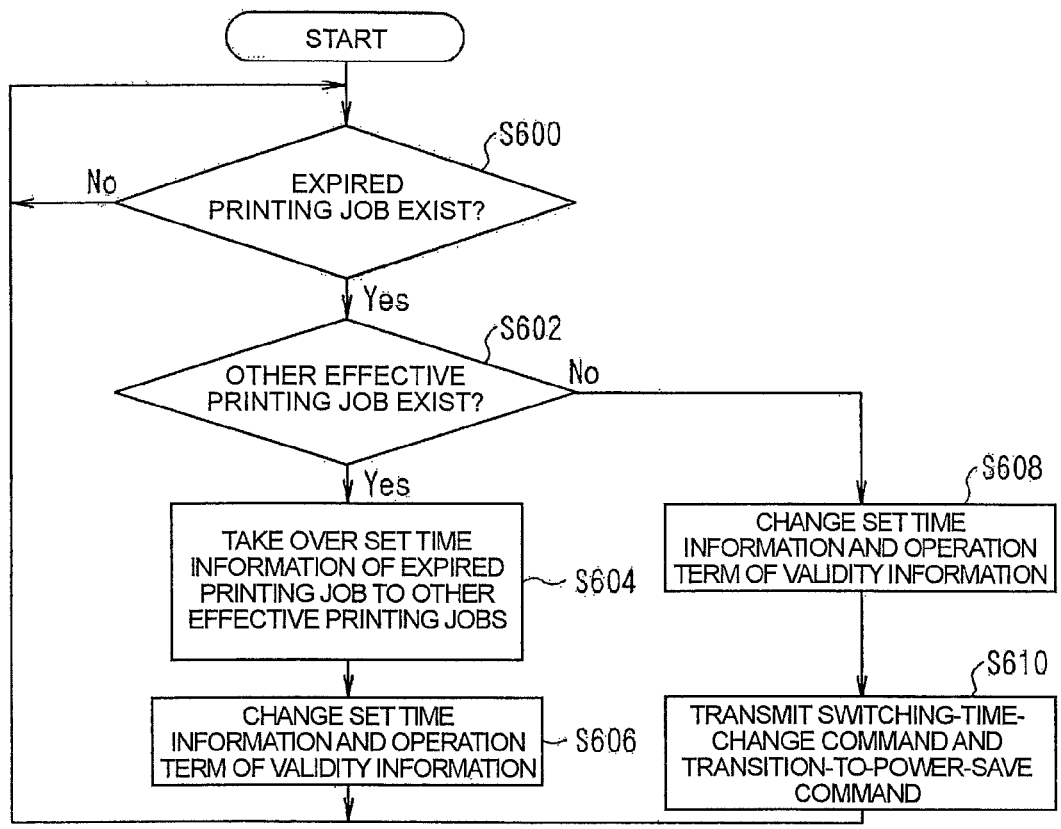
FIG. 11 is a flowchart showing a term-of-validity managing process.

FIG. 11 is a flowchart showing the term-of-validity managing process.

The term-of-validity managing process is a process for changing the operation term of validity information and the set time information corresponding to the printing job whose operation term of validity is expired on the basis of observation information from the term-of-validity observing unit 21 and executing succession process of the set time information. When this process is executed in the CPU 50, the procedure goes to Step S600 first as shown in FIG. 11.

In Step S600, the operating state control unit 19 determines whether or not there exists a printing job whose operation term of validity is expired among the printing jobs stored in the data memory unit 18 on the basis of the observation information regularly acquired from the term-of-validity observing unit 21. When it is determined to exist (Yes), the procedure goes to Step S602, and if not (No), the determination process is continued until it is determined to exist.

When the procedure goes to Step S602, the operating state control unit 19 determines whether or not an effective printing job whose operation term of validity is not expired is stored in the data memory unit 18 in addition to the printing job which is determined to be expired in term of validity in Step S600. If it is determined to be stored (Yes), the procedure goes to Step S604, and if not (No), the procedure goes to Step S608.

When the procedure goes to Step S604, the operating state control unit 19 changes the set time information corresponding to the printing job whose term of validity is expired (succession of the set time information), and the procedure goes to Step S606.

In Step S606, the operating state control unit 19 changes the set term information and the operation term of validity information corresponding to the printing job which is determined to be expired in term of validity in Step S600 into information indicating that it is not an object of control (for example, NULL) and the procedure goes to Step S600.

On the other hand, when there is no other effective printing job stored and the procedure goes to Step S608 in Step S602, the operating state control unit 19 changes the set time information and the operation term of validity information corresponding to the printing job which is determined to be expired in term of validity in step S600 into information indicated that it is not an object of control (for example, NULL), and the procedure goes to Step S610.

In Step S610, the operating state control unit 19 generates a switching-time-change command for causing the switching time which is currently set in the printing device 300 to be changed into the switching time indicated by the set time information corresponding to the printing job which is determined to be expired in term of validity in Step S600, and transmits the switching-time-change command and the transition-to-power-save command to the printing device 300 via the data communication unit 16, and then the procedure goes to Step S600.

Figure 12:
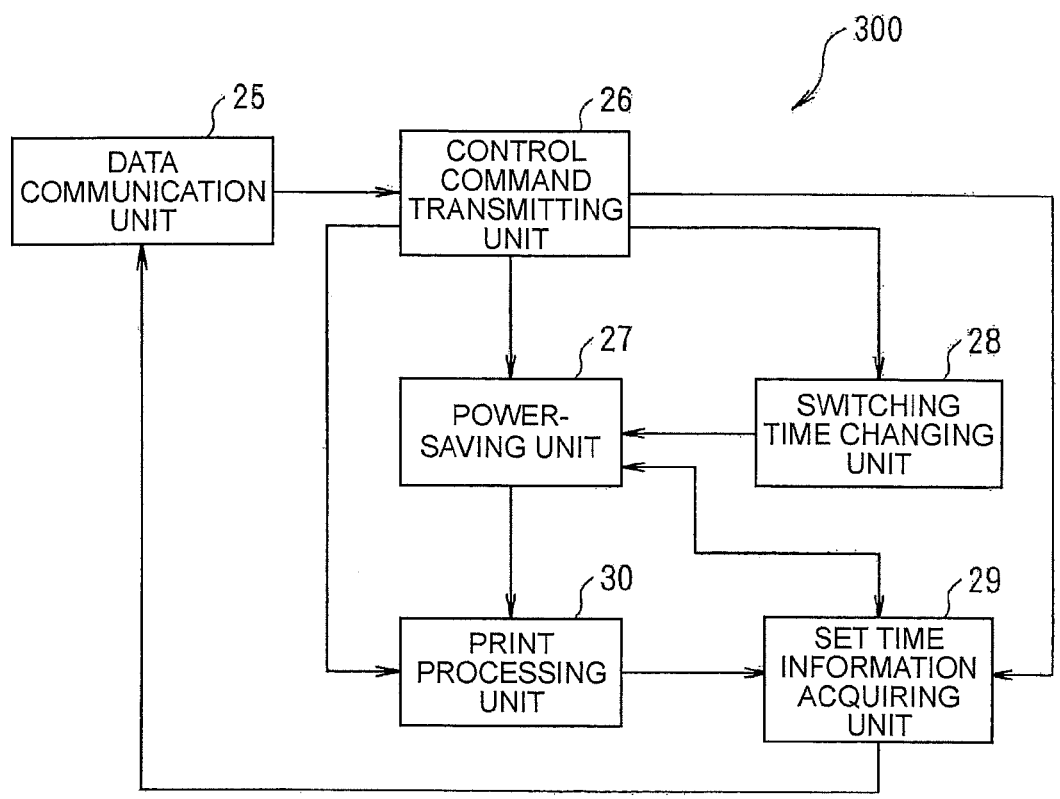
FIG. 12 is a block diagram showing a functional structure of a printing device 300.

Referring further to FIG. 12, a detailed functional structure of the printing device 300 will be described. FIG. 12 shows a block diagram showing a functional structure of the printing device 300.

As shown in FIG. 12, the printing device 300 includes a data communication unit 25 that performs data communication with the printing device management device 200, via the network 199 a control command transmitting unit 26 that determines various control commands, various requests and printing jobs received from the printing device management device 200 via the data communication unit 25, and transmits them to suitable functional units, a power-saving unit 27 that switches the state of a print processing unit 30 to either one of the active state and the power-saving state on the basis of the control command transmitted from the control command transmitting unit 26 and the preset switching time, a switching time changing unit 28 that changes the switching time which is currently set to the switching time specified by the switching-time-change command transmitted from the control command transmitting unit 26, a set time information acquiring unit 29 that acquires the set time information which is information of the currently set switching time on the basis of the set time information acquisition request transmitted from the control command transmitting unit 26 and transmits the acquired set time information to the printing device management device 200, and the print processing unit 30 that executes the printing-job-based printing process.

Subsequently, a hardware structure of the printing device 300 will be described.

Figure 13:
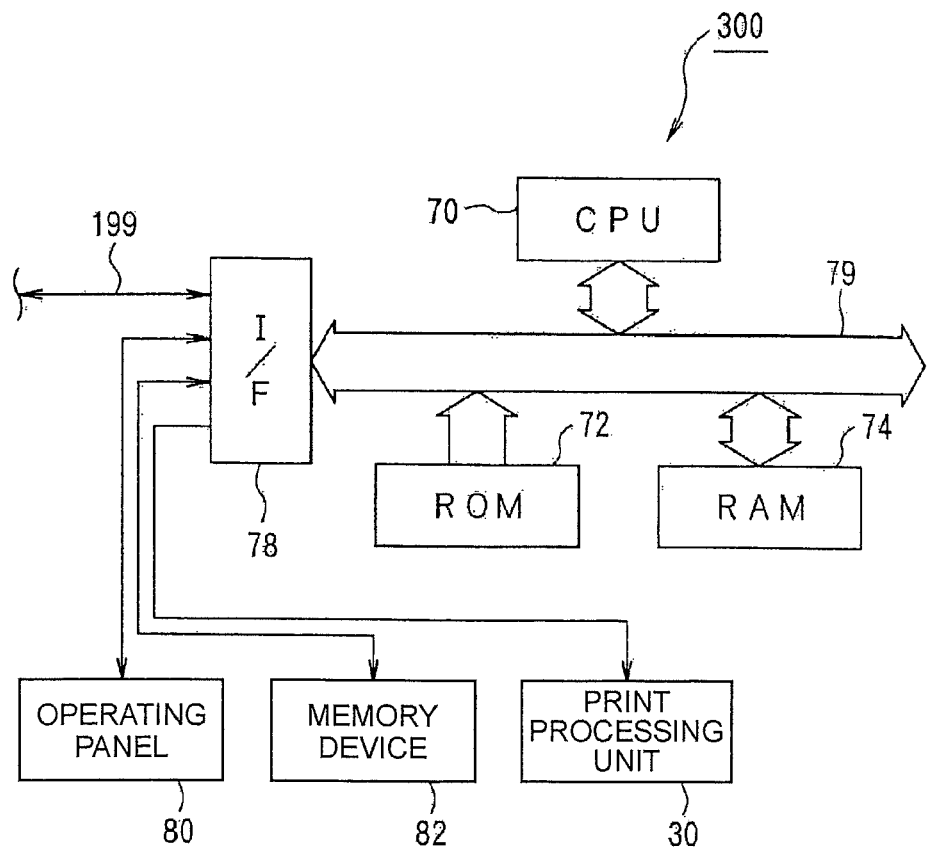
FIG. 13 is a block diagram showing a hardware structure of the printing device 300.

FIG. 13 is a block diagram showing a hardware structure of the printing device 300.

As shown in FIG. 13, the printing device 300 includes a CPU 70, a ROM 72, a Ram 74, and an I/F 78, all being connected with respect to each other by a bus 79, and an operating panel 80 such as a touch panel or the like that can input or display data as a human interface, a memory device 82, the print processing unit 30, and signal lines for connecting with the network 199, all being connected to the I/F 78 as in the case of the print instruction issuing device 100.

The CPU 70 is composed of a micro-processing unit or the like, and activates a predetermined program stored in the predetermined area in the ROM 72 and executes a set time information transmitting process, the state switching process, the switching time changing process, and printing process shown in the flowcharts in FIG. 14, FIG. 15, FIG. 16 and FIG. 17, respectively according to the activated program.

The set time information transmitting process will be described first.

Figure 14:
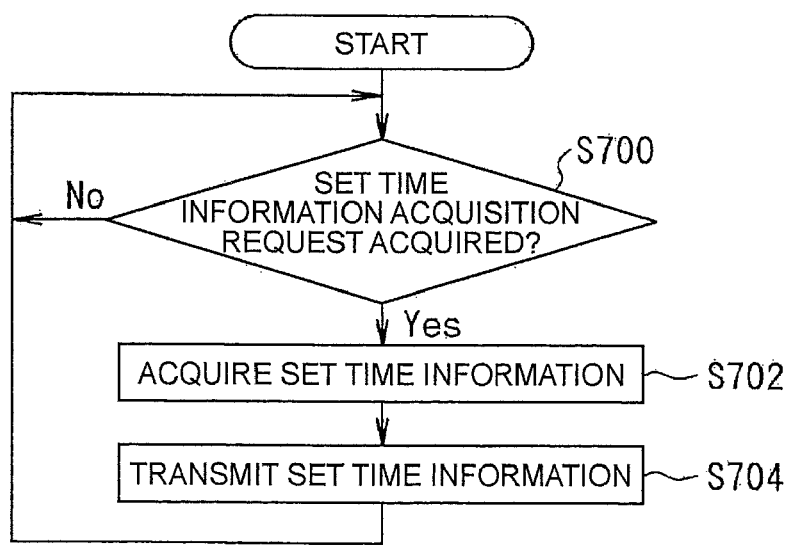
FIG. 14 is a flowchart showing a time information transmitting process.

FIG. 14 is a flowchart showing the set time information transmitting process.

The set time information transmitting process is a process for acquiring the set time information on the basis of the set time information acquisition command from the printing device management device 200 and transmitting the acquired set time information to the printing device management device 200. When this process is executed in the CPU 70, the procedure goes to Step S700 as shown in FIG. 14.

In Step S700, the set time information acquiring unit 29 determines whether or not the set time information acquisition command is acquired from the control command transmitting unit 26. When it is determined to be acquired (Yes), the procedure goes to Step S702, and if not (No), the determination process is continued until it is acquired.

When the procedure goes to Step S702, the set time information acquiring unit 29 acquires the set time information from the power-saving unit 27, and the procedure goes to Step S704. In this embodiment, the power-saving unit 27 also has a function to measure an elapsed time from the set time by a timer or the like, not shown.

In Step S740, the set time information acquiring unit 29 transmits the set time information acquired in Step S702 to the printing device management device 200 via the data communication unit 25, and the procedure goes to Step S700.

Subsequently, the state switching process will be described.

Figure 15:
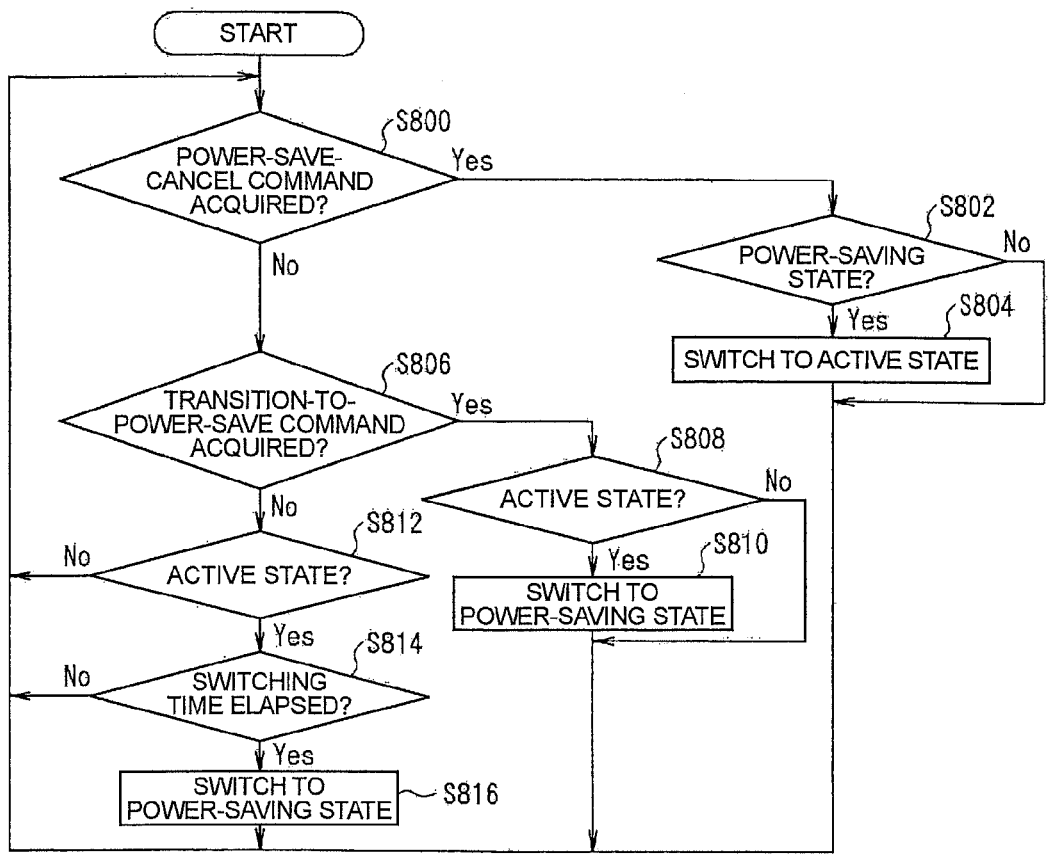
FIG. 15 is a flowchart showing a state switching process.

FIG. 15 is a flowchart showing the state switching process.

The state switching process is a process for switching the state of the print processing unit 30 into either one of the active state and the power-saving state on the basis of a command from the printing device management device 200 and a remaining time to the switching time. When this process is executed by the CPU 70, the procedure goes to Step S800 first as shown in FIG. 15.

In Step S800, the power-saving unit 27 determines whether or not the power-save-cancel command is received from the control command transmitting unit 26. When it is determined to be received (Yes), the procedure goes to Step S802, and if not (No), the procedure goes to Step S806.

When the procedure goes to Step 802, the power-saving unit 27 determines whether or not the state of the print processing unit 30 is the power-saving state. When it is determined to be in the power-saving state (Yes), the procedure goes to Step S804, and if not (No), the elapsed time of the active state is cleared (reset to a initial value (0, for example), and the procedure goes to Step S800.

When the procedure goes to Step S804, the power-saving unit 27 switches the state of the print processing unit 30 from the power-saving state to the active state, the elapsed time of the active state is cleared, and the procedure goes to Step S800.

When the procedure goes to Step S806, the power-saving unit 27 determines whether or not the transition-to-power-save command is received from the control command transmitting unit 26. When it is determined to be received (Yes), the procedure goes to Step S808, and if not (No) the procedure goes to Step S812.

When the procedure goes to Step S808, the power-saving unit 27 determines whether or not the state of the print processing unit 30 is active state. When it is determined to be in the active state (Yes), the procedure goes to Step S810, and if not (No), the procedure goes to Step S800.

When the procedure goes to Step S810, the power-saving unit 27 switches the state of print processing unit 30 from the active state to the power-saving state, the elapsed time of the active state is cleared, and the procedure goes to Step S800.

When the procedure goes to Step S812, the power-saving unit 27 determined whether or not the print processing unit 30 is the active state. When it is determined to be in the active state (Yes), the procedure goes to Step S814, and if not (No), the procedure goes to Step S800.

When the procedure goes to Step S814, the power-saving unit 27 determines whether or not the elapsed time of the active state passed over the currently set switching time. When it is determined to be passed over (Yes), the procedure goes to Step S816, and if not (No), the procedure goes to Step S800.

When the procedure goes to Step S816, the power-saving unit 27 switches the state of the print processing unit 30 from the active state to the power-saving state, the elapsed time of the active state is cleared, and the procedure goes to Step S800.

Subsequently, the switching time changing process will be described.

Figure 16:
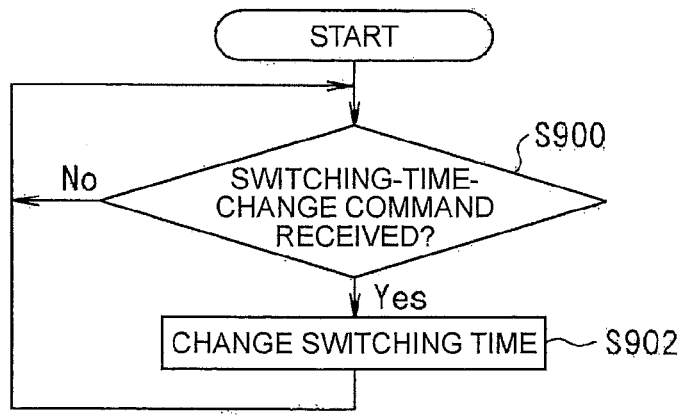
FIG. 16 is a flowchart showing a switching time changing process.

FIG. 16 is a flowchart showing the switching time changing process.

The switching time changing process is a process for changing the currently set switching time into a switching time specified by a switching-time-change command on the basis of the switching-time-change command from the printing device management device 200. When this process is executed by the CPU 70, the procedure goes to Step S900 first as shown in FIG. 16.

In Step S900, the switching time changing unit 28 determines whether or not the switching-time-change command is acquired from the control command transmitting unit 26, and if it is determined to be acquired (Yes), the procedure goes to Step S902, and if not (No), the determination process is continued until it is acquired.

When the procedure goes to Step S902, the switching-time-change unit 28 changes the currently set switching time into a switching time specified by the switching-time-change command acquired in Step S900, and the procedure goes to Step S900.

Subsequently, the printing process will be described.

Figures 17, 18:
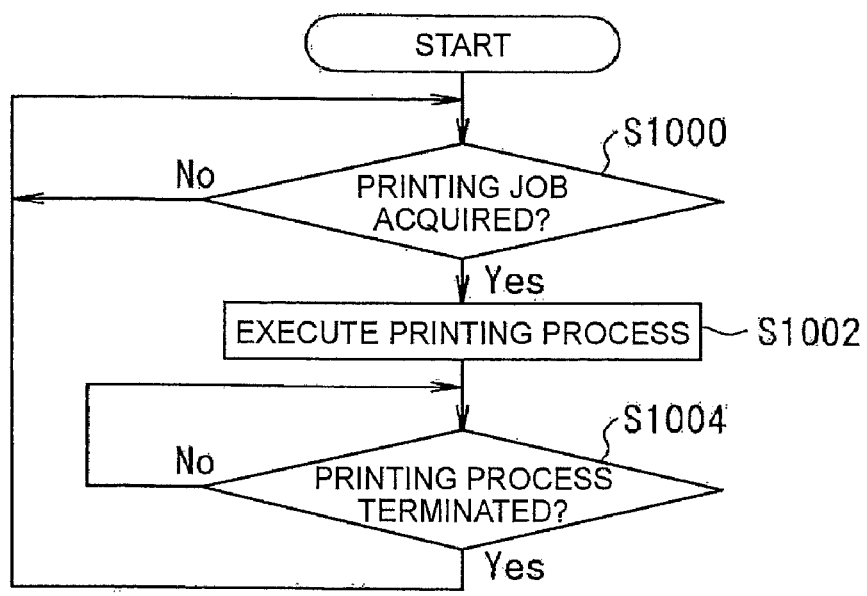
FIG. 17 is a flowchart showing a printing process.
FIG. 18 is a drawing showing a data structure of a print request information 400.

FIG. 17 is a flowchart showing the printing process.

The printing process is a process for performing the printing process for forming an image indicated by the printing data on a printing medium on the basis of the printing job from the printing device management device 200. When this process is executed by the CPU 70, the procedure goes to Step S1000 first as shown in FIG. 17.

In Step S1000, the print processing unit 30 determines whether or not the printing job is received from the control command transmitting unit 26. When it is determined to be received (Yes), the procedure goes to Step S1002, and if not (No), the determination process is continued until it is received.

When the procedure goes to Step S1002, the print processing unit 30 executes the printing process on the basis of the printing job received in Step S1000, and the procedure goes to Step S1004.

In Step S1004, the print processing unit 30 determines whether or not the currently executing printing process is terminated. If it is determined to be terminated (Yes), the procedure goes to Step S1000, and if not (No), the determination process is continued until it is terminated. When a plurality of printing jobs are received during the printing process, they are stored in the memory device 82 so that the order of reception can be determined, and kept in a hold state.

Figure 20:
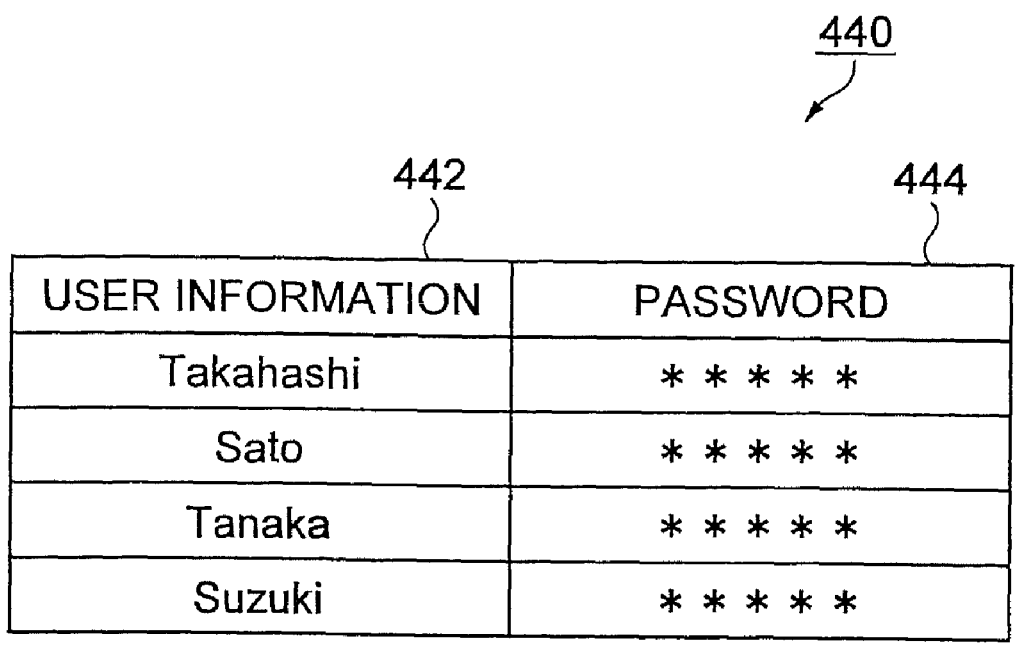
FIG. 20 is a drawing showing a data structure of second authentication information.

Subsequently, referring now to FIG. 18 to FIG. 20, the operation of this embodiment will be described. Here, FIG. 18 is a drawing showing a data structure of print request information 400. FIG. 19A and B are drawings showing a data structure of a printing job management table 420. FIG. 20 is a drawing showing a data structure of the second authentication information.

In the print instruction issuing device 100, printing data (in this case, document data) is read from the data memory unit 13 (Step S102) according to the print instruction from the user via a document editor (Step S100), and then, as shown in FIG. 18, the print request information 400 including the respective fields of a user ID 402, a document data name 404, terminal information (information on the destination printing device) 406, date and time of print 408, and a print setting 410 is generated (Step S104). Then, by adding the print request information 400 to the document data body, the printing job is generated (Step S106). The generated printing job is transmitted to the printing device management device 200 via the print instruction issuing unit 11 and the data communication unit 10 (Step S108).

On the other hand, the printing device management device 200 issues a job ID which is a serial number indicating the order of reception of the printing job (Step S302) upon reception of the printing job from the print instruction issuing device 100 (Step S300), and stores the received printing job in the data storage unit 18 (Step S304). Then, the printing device management device 200 updates the contents of the printing job management table 420 shown in FIG. 19A (Step S306). Here, as shown in FIG. 19A the update process of the printing job management table 420 in Step S306 is performed by registering records in the respective fields of a job ID 422, a user ID information 424, a file name (name of document data) 426, the number of times of printing 432, and other information 434 which constitute the printing job management table 420 on the basis of the issued job ID, and the print request information and the switching time information provided to the printing job. In the case of FIG. 19A, "1" as the job ID, "takahashi" as the user information, "0001.prn" as the filename of the printing data, and "0" as the number of times of printing are registered in the first line of the record. This unit that the user having the user ID "takahashi" issued a printing request, the printing process is not performed.

When a new printing job (for example, a job ID 2) is stored in the data memory unit 18 (Step S400), the printing device management device 200 issues a set time information acquisition request to the destination printing device 300 of the print instruction for the printing job having the job ID 2 (hereinafter, referred to as printing job 2) (Step S402).

On the other hand, when the printing device 300 receives the set time information acquisition request from the printing device management device 200, the printing device 300 transmits the received set time information acquisition request from the control command transmitting unit 26 to the set time information acquiring unit 29. Upon reception of the set time information acquisition request (the step to be proceeded when the answer in Step S700 is Yes), the set time information acquiring unit 29 acquires the set time information (thirty minutes, for example) as the information of the currently set switching time (Step S702), and transmits the acquired set time information to the printing device management device 200 (Step S704).

In addition, when control command transmitting unit 26 receives the power-save-cancel command issued from the printing device management device 200 almost simultaneously with the set time information acquisition request, the printing device 300 transmits the received power-save-cancel command to the power-saving unit 27. When the power-saving unit 27 receives the power-save-cancel command (the step to be proceeded when the answer in Step S800 is "Yes"), the print processing unit 30 determines whether or not it is currently in the power-saving state. When it is determined to be the power-saving state (the step to be proceeded when the answer in Step S802 is "Yes"), the print processing unit 30 switches the state from the power-saving state to the active state (Step S810). On the other hand, when it is the active state (the step to be proceeded when the answer in Step S802 is "No"), the elapsed time of the active state is cleared. In other words, when a printing job 4 is stored in the printing device management device 200, and if the printing device 300 is in the power-saving state, the state is changed immediately to the active state, and if it is in the active state, the elapsed time is cleared and the active state is continued by the currently set switching time.

On the other hand, when the printing device management device 200 receives the above-described set time information from the printing device 300 (the step to be proceeded when the answer in Step S404 is "Yes"), the printing device management device 200 registers a setting time "10 minutes" in the corresponding record in the field of a set time information 430 corresponding to the job ID2 in the printing job management table 420 as shown in FIG. 19A on the basis of the received set time information (10 minutes in this case), and updates the printing job management table 420 (Step S406).

Then, current time information of the printing device management device 200 is acquired (Step S408), and the operation term of validity, which corresponds to the term of validity of the active state for the printing job 4, is calculated on the basis of the acquired current time (for example, March 22nd, 18:07) and the switching time (10 minutes) shown by the received set time information (Step S410). In this case, "March 22nd, 18:17" which is obtained by adding "10 minutes" as the switching time to the current time "March 22nd, 18:07" is calculated as the operation term of validity. Then the operation term of validity information, which is the calculated operation term of validity information, is registered to the record in the field of an operation term of validity information 428 corresponding to the job ID2 as the operation term of validity "March 22nd, 18:17→322187" in the printing job management table 420 as shown in FIG. 19A, and the printing job management table 420 is updated (Step S424).

Subsequently, when the switching-time-change instruction is issued from the user before the printing process of the printing job 2 is performed (the step to be proceeded when the answer in Step S200 is "Yes"), the switching-time-change instruction unit 14 displays the switching-time-change instruction screen in response to the instruction (Step S202). In this case, it is assumed that the lower limit value of the switching time that the user can set is "1 minute", and the upper limit value is "30 minutes". Therefore, the user can input a desired switching time between 1 minute and 30 minutes. When the user inputs the switching time (30 minutes, for example) via the input device 40 (the step to be proceeded when the answer in Step S204 is "Yes"), and hence the input switching time is fixed (the step to be proceeded when the answer in Step S206 is "Yes"), the switching-time-change instruction information for changing the currently set switching time (10 minutes) in the printing device 300 as the object to be changed into the fixed switching time (30 minutes) is generated (Step S208). The generated switching-time-change instruction information is transmitted to the printing device management device 200 via the data communication unit 10 (Step S210).

On the other hand, when the printing device management device 200 receives the switching-time-change instruction information from the print instruction issuing device 100 (Step S414), the printing device management device 200 generates the switching-time-change command for causing the switching time to be changed into 30 minutes on the basis of the information of the printing device 300 to be changed and the switching time information (30 minutes) set by the user included in the switching-time-change instruction information (Step S416), and issues the generated switching-time-change command to the printing device 300 to be changed via the data communication unit 16 (Step S418). Furthermore, the term of validity information of the printing job corresponding to the printing device 300 to be changed is acquired from the data memory unit 18 (Step S420). Then, since there exists a printing job whose term of validity is not expired, for example, the printing job 2 shown in FIG. 19A (the step to be proceeded when the answer in Step S422 is "Yes"), the printing device management device 200 acquires the current time information (in this case, it is assumed that March 22nd, 18:09 is acquired) (Step S424), calculates "March 22nd, 18:39" obtained by adding "30 minutes", which corresponds to the switching time after having changed into the current time "March 22nd, 18:09", as a new operation term of validity on the basis of the switching-time-change instruction information "30 minutes" and the current time information "March 22nd, 18:09", and updates the currently registered "March 22nd, 18:17" into the calculated "March 22nd, 18:39" (Step S426).

On the other hand, when the printing device 300 receives a switching-time-change command (command to change the currently set switching time (10 minutes) to 30 minutes) from the printing device management device 200, the control command transmitting unit 26 transmits the received switching-time-change command to the switching time changing unit 28. Upon reception of the switching-time-change command (Step S900), the switching time changing unit 28 changes the currently set switching time "10 minutes" to "30 minutes" (Step S902). At this time, if the printing device 300 is in the active state, the elapsed time is cleared, and the elapsed time is re-counted.

As the printing job management table 420 shown in FIG. 19B, in a state in which unprocessed printing jobs having job IDs 1, 2, 4, 6 and the processed printing jobs having job IDs 3, 5 are stored in the data memory unit 18, when the first authentication information (for example, the user information "sato" and a password "***") are entered via the card reader 22 (Step S500), the user authentication unit 23 collates the entered first authentication information and a second authentication information table 440 composed of two fields of a user ID 442 and a password 444 as shown in FIG. 20 (Step S502). Then, when there is information which coincides with the first authentication information in the second authentication information table 440, the user who swiped an IC card is authenticated. In this case, since the information which coincides with the first authentication information in the second authentication information, the user is authenticated (the step to be proceeded when the answer in Step S504** is "Yes").

When the user is authenticated in this manner, the printing job 2 having the job ID 2 corresponding to the user information "sato" is detected from the printing job stored in the data memory unit 18, and is read from the data memory unit 18 (Step S506). Then, the read printing job 2 is transmitted to the printing device 300 (Step S508).

When the printing device 300 receives printing data from the printing device management device 200, the control command transmitting unit 26 transmits the received printing job to the print processing unit 30, and upon acquisition of the printing job (Step S1000), the print processing unit 30 executes the printing process including a rendering process, a rasterizing process, image forming process, and so on according to the printing data contained in the printing job (Step S1002) to form an image on the printing medium (the step to be proceeded when the answer in Step S1004 is "Yes"). Here, when the printing device 300 is in the active state, the printing process is started immediately after acquiring the printing job. However, in the power-saving state, the printing device is changed to the active state after warming up, and printing process is started thereafter.

On the other hand, after having transmitted the printing job 2, the printing device management device 200 still has the printing jobs 4, 6 whose operation term of validity are not expired remained in the printing job stored in the data memory unit 18 (the step to be proceeded when the answer in Step S510 is "Yes"), and since the term of validity of the printing job 2 is shorter than the terms of validity of these printing jobs (smaller in ID number) (the step to be proceeded when the answer in Step S512 is "Yes"), the printing device management device 200 changes the set times "30 minutes" of the printing jobs 4, 6 to the set time "10 minutes" of the printing job 2 by overwriting the set time information (10 minutes) corresponding to the printing job 2 on the set time information corresponding to the printing jobs 4, 6 (step S514). Then, register values corresponding to the job ID 2 in the field of the set time information 430 and the operation term of validity information 428 from the printing job management table 420 are changed to "NULL" and the value "0" registered in the record of the number of times of printing 432 is changed into the value "1" to update the printing job management table 420 (Step S516).

The term-of-validity observing unit 21 of the printing device management device 200 observes the operation term of validity information of the respective printing jobs stored in the data memory unit 18 and the time information of the clock function, not shown regularly, and when the operation term of validity of the stored printing job is expired, gives notice to the operating state control unit 19. When the time is elapsed in a state in which the printing job 2 is not under the control, and the printing jobs 4, 6 are remained under control, the printing process of the printing job 4 is executed, and the notice that indicates expiration of the operation term of validity of the printing job 6 is received from the term of validity observing unit 21 (the step to be proceeded when the answer in Step S600 is "Yes"), since there is no other printing job whose operation term of validity is not expired (the step to be proceeded when the answer in Step S602 is "No"), the record values in the fields of the set time information and the operation term of validity information of a job ID 6 in the printing job management table 420 are changed respectively into "NULL" (Step S608), a switching-time-change command for causing the current switching time "30 minutes" of the printing device 300 to be changed into the switching time "10 minutes" indicated by the set time information succeeded from the printing job 2 is generated, and the switching-time-change command and a transition-to-power-save command is transmitted to the printing device 300 (Step S610).

Upon reception of the switching-time-change command (changed into "10 minutes") and the transition-to-power-save command from the printing device management device 200, the control command transmitting unit 26 of the printing device 300 transmits the received switching-time-change command to the switching time changing unit 28, while transmitting the transition-to-power-save command to the power-saving unit 27.

Upon reception of the switching-time-change command (Step S900), the switching time changing unit 28 changes the currently set switching time "30 minutes" to "10 minutes" (Step S902). In other words, the switching time of the printing device 300 is returned to the initial state. On the other hand, upon reception of the transition-to-power-save command (the step to be proceeded when the answer in Step S806 is "Yes"), the power-saving unit 27 confirms whether or not the print processing unit 30 is currently in the active state. When it is determined to be the active state (the step to be proceeded when the answer in Step S808 is "Yes"), the state is switched from the active state to the power-saving state (Step S810).

In this manner, according to this embodiment, upon reception of the printing job from the print instruction issuing device 100, the printing device management device 200 can transmit the power-save-cancel command immediately to the destination printing device 300 for the printing job to change the state into the active state.

Accordingly, even when the destination printing device 300 of the print instruction for the received printing job is in the power-saving state, it can immediately be changed into the active state, and hence the user can cause the printing device 300 to start the printing process sooner than in the related art after having transmitted the printing job.

Furthermore, by generating a change instruction for changing the switching time information set in the printing device 300 into the user-desired switching time by the switching-time-change instruction unit 14 and issuing the generated change instruction to the printing device management device 200, the printing device management device 200 is adapted to issue a switching-time-change command for causing the switching time currently set in the printing device 300 to be changed into the switching time indicated by the change instruction to the corresponding printing device 300 upon reception of the change instruction from the switching-time-change instruction issuing unit 14.

Accordingly, since a waiting time for the active state of the printing device 300 for the corresponding printing job can be changed to the switching time indicated by a change instruction information (a switching time that the user desires), the user can cause the printing device 300 to start the printing process sooner than in the relate art as long as it is within a preset switching time after the transmission of the printing job.

In addition, according to this embodiment, the printing device management device 200 acquires the current switching time information (set time information) set in the printing device 300 and remains the same in coordination with the corresponding printing job after having received the printing job. Then, after having changed into the user-desired switching time, if there is no other printing jobs whose operation terms of validity are not expired stored in the data memory unit 18 after termination of the printing process of the corresponding printing job or after having elapsed the operation term of validity, the switching time currently set in the printing device 300 is changed into the switching time indicated by the acquired set time information. On the other hand, when there are a plurality of printing jobs whose operation term of validity are not expired stored in the data memory unit 18, the set time information of the printing jobs whose operation term of validity are not expired are changed into the set time information corresponding to the printing job stored the earliest time (a printing job whose operation term of validity is the shortest) after the printing process of the printing job stored at the earliest time has elapsed or after the operation term of validity has elapsed.

Accordingly, when the printing jobs are not under the control any longer after the switching time is changed into the user-desired time, the switching time set in the printing device 300 can be changed into the switching time indicated by the set time information corresponding to the printing job stored at the earliest time. Therefore, the switching time which is originally set in the printing device 300 can easily be restored, and hence occurrence of failure caused by being kept in a state in which the useless switching time is continuously set can be prevented.

Furthermore, in this embodiment, the printing device management device 200 generates the operation term of validity information, which is the term of validity of a duration of the active state of the printing device 300, for the respective printing jobs received from the print instruction issuing device 100 on the basis of the set time information acquired after reception of the printing jobs and the time information after reception. Then, the term-of-validity observing unit 21 observes the operation term of validity, and if there is a printing job whose term of validity is expired, precludes the corresponding printing job. At the same time, when the corresponding printing job is stored at the earliest time and there are a plurality of printing jobs whose terms of validity are not expired, the set time information of other printing jobs are changed into the set time information corresponding to the printing job stored at the earliest time.

Accordingly, the switching time set in the printing device 300 can be changed to the switching time indicated by the when all the printing jobs subjected to the switching-time-change process are precluded from the object of control, the switching time set in the printing device 300 can be changed into the switching time indicated by the set time information corresponding to the printing job stored at the earliest time. Therefore, the switching time originally set in the printing device 300 can easily be restored, and hence the occurrence of failure caused by being kept in a state in which the useless switching time is continuously set can be prevented.

In the above-described embodiment, the printing job transmitting processes executed by the print instruction issuing unit 11 and the data communication unit 10 correspond to output instruction issuing unit in Mode 3, or print instruction issuing unit in Mode 10 or 16, and the switching-time-change instruction issuing unit 14 corresponds to switching-time-change instruction issuing unit according to any one of Modes 3, 10, 16 and 17.

In the above-described embodiment, the step S108 corresponds to the print instruction issuing step in Mode 27 or 40.

In the above-described embodiment, Steps S200 to S214 correspond to switching-time-change instruction issuing step according to any one of Modes 27, 28, and 40.

In the above-described embodiment, the printing job storing unit 17 corresponds to output data storing unit according to any one of Modes 1, 2, 3, 4 and 6, or printing job storing unit according to any one of Modes 9, 10, 11, 13, 16, 18, 19 and 27, and the data memory unit 18 and the memory device 62 correspond to output data memory unit according to any one of Modes 1, 2, 3, 4, 6 and 7, or printing job memory unit according to any one of Modes 8, 9, 10, 11, 13, 14, 16, 18, 27, 29, 38, 39 and 41.

In the above-described embodiment, the operating state control unit 19 corresponds to operating state controlling unit according to any one of Modes 1, 2, 3, 4, 6, 7, 8, 9, 10, 11, 13, 14, 18, 19 and 20, the set time information acquiring unit 20 corresponds to set time information acquiring unit according to any one of Modes 6, 13 and 19, and the term-of-validity observing unit 21 corresponds to elapse observing unit according to any one of Modes 6, 7, 13, 14 and 19.

In the above-described embodiment, the card reader 22 corresponds to authentication information acquiring unit according to any one of Modes 1, 2, 4, 8, 9, 11, and 18, the user authentication unit 23 corresponds to usage-qualification determining unit according to any one of Modes 1, 2, 4, 8, 9, 11 and 18, and the printing job transmitting unit 24 corresponds to output data transmitting unit in Mode 4 or printing job transmitting unit in Mode 11 or 18.

In the above-described embodiment, Steps S300 to S306 correspond to a printing job storage step according to any one of Modes 29, 38, 39, 40, 41 and 43, and Steps S400 to S428 correspond to an operating state controlling step according to any one of Modes 29, 30, 31, 38, 39, 40, 41, 43 and 44.

In the above-described embodiments, Step S500 corresponds to an authentication information acquisition step according to any one of Modes 29, 38, 39 and 41, Step S502, S504 correspond to the usage-qualification determining step according to any one of Modes 29, 38, 39 and 41, Step S506, S508 corresponds to the printing job transmitting step in Mode 29 or 41, Steps S510 to S518 correspond to an operating state controlling step according to any one of Modes 29, 30, 31, 38, 39, 40, 41, 43 and 44, and Steps S600 to S612 correspond to the operating state controlling step according to any one of Modes 29, 30, 31, 38, 39, 40, 41, 43 and 44.

In the above-described embodiment, the power-saving unit 27 corresponds to power-save switching unit according to any one of Modes 1, 2, 4, 6, 7, 8, 9, 11, 13, 14, 21, 22, 24, 25 and 26, the switching time changing unit 28 corresponds to switching time changing unit according to any one of Modes 3, 6, 7, 10, 13, 14 and 20, the print processing unit 30 corresponds to output processing unit according to any one of Modes 1, 2 and 4 or print processing unit according to any one of Modes 8, 9 and 11, and printing job receiving process executed by the data communication unit 25 and the control command transmitting unit 26 correspond to the output data receiving unit in Mode 4 or the printing job receiving unit in Mode 11.

In the above-described embodiment, Steps S800 to S816 correspond to a power-save switching step according to any one of Modes 38, 39, 43 and 44, Steps S900 to S902 correspond to a switching time changing step according to any one of Modes 31, 40, 43 and 44, Step S1000 corresponds to a printing job receiving step in Mode 41, and Steps S1002, S1004 correspond to a print processing step according to any one of Modes 38, 39 and 41.

In the above-described embodiment, the controlling process and the authentication process for the state of the printing device 300 are executed in the printing device management device 200, which is a member separate from the printing device 300. However, the invention is not limited thereto, and the printing device 300 may be provided with the function of the printing device management device 200. In this case, transmission and reception of various data such as the printing job, various commands such as the switching-time-change command, and various commands such as the time information acquisition request between the printing device management device 200 and the printing device 300 are not necessary, and correspondence with the modes is as follows.

In the above-described embodiment, the printing job storing unit 17 corresponds to the output date storing unit according to any one of Modes 1, 2, 3, 5 and 6, or the printing job storing unit according to any one of Modes 8, 9, 10, 12, 13, 16, 24 and 27, and the data memory unit 18 and the memory device 62 corresponds to the output data memory unit according to any one of Mode 1, 2, 3, 5, 6, and 7, or the printing job memory unit according to any one of Modes 8, 9, 10, 12, 13, 14, 16, 21, 24, 27, 32, 35, 38 and 39.

In the above-described embodiment, the operating state control unit 19 corresponds to the operating state controlling unit according to any one of Modes 1, 2, 3, 5, 6, 7, 8, 9, 10, 12, 13, 14, 21, 22, 23, 24, 25 and 26, and the set time information acquiring unit 20 corresponds to the set time information acquiring unit according to any one of Modes 6, 13 and 25, and the term-of-validity observing unit 21 corresponds to the elapse observing unit according to any one of Modes 6, 7, 13, 14, 25 and 26.

In the above-described embodiment, the card reader 22 corresponds to the authentication information acquiring unit according to any one of Modes 1, 2, 5, 8, 9, 12 and 24, and the user authentication unit 23 corresponds to the usage-qualification determining unit according to any one of Modes 1, 2, 5, 8, 9, 12 and 24.

In the above-described embodiment, Steps S300 to S306 correspond to the printing job storage step according to any one of Modes 35, 38, 39, 40, 42, and 43, and the Steps S400 to S428 correspond to the operating state controlling step according to any one of Modes 32, 33, 34, 35, 36, 37, 38, 39, 40, 42, 43, and 44.

In the above-described embodiment, Step S500 corresponds to the authentication information acquisition step according to any one of Modes 35, 38, 39, and 42, Steps S502 and S504 correspond to the usage-qualification determining step according to any one of Modes 35, 38, 39 and 42, Steps S510 to S518 correspond to the operating state controlling step according to any one of Modes 32, 33, 34, 35, 36, 37, 38, 39, 40, 42, 43, and 44, and Steps S600 to S612 correspond to the operating state controlling step according to any one of Modes 32, 33, 34, 35, 36, 37, 38, 39, 40, 42, 43 and 44.

In the above-described embodiment, the power-saving unit 27 corresponds to the power-save switching unit according to any one of Modes 1, 2, 5, 6, 7, 8, 9, 12, 13, 14, 21, 22, 24, 25 and 26, the switching time changing unit 28 corresponds to the switching time changing unit according to any one of Modes 3, 6, 7, 10, 13, 14, 23, 25 and 26, the print processing unit 30 corresponds to the output processing unit in Modes 1 or 2 or the print processing unit according to any one of Modes 8, 9, 21 and 22, and printing job receiving unit in Mode 22.

In the above-described embodiment, Steps S800 to S816 correspond to the power-save switching step according to any one of Modes 32, 33, 35, 36, 37, 38, 39, 43 and 44, Steps S900 to S902 correspond to the switching time changing step according to any one of Modes 34, 36, 37, 40, 43 and 44, Step S1000 corresponds to the printing job receiving step in Mode 33, and Steps S1002 and S1004 correspond to the print processing step according to any one of Modes 32, 33, 38 and 39.

In the above-described embodiment, as shown in FIG. 1, the printing device management device 200 is described to have a structure of managing one printing device 300. However, the invention is not limited thereto, and a structure in which the printing device management device 200 manages a plurality of printing devices 300 may also be applicable. In the case of the structure of managing the plurality of printing devices, for example, information on the destination printing devices 300 is additionally registered in the printing job management table 420 for management.

In the above-described embodiment, when executing the processes shown in the flowcharts in FIG. 4, FIG. 5, FIG. 8, FIG. 9, FIG. 10, FIG. 11, FIG. 14, FIG. 15, FIG. 16 and FIG. 17, the control programs stored in the ROMs 33, 52, 72, in advance are used in the description. However, the invention is not limited thereto, and it is also possible to read the programs from the storage medium in which the program indicating these procedures are stored into the RAMs 34, 54, 74 for execution.

The storage medium in this case is a semiconductor storage medium such as PAM or ROM, a magnetically recording type storage medium such as FD or HD, an optically reading type storage medium such as CD, CDV, LD, DVD, or a magnetically recording/optically reading storage medium such as MO, and any types of storage medium are included as long as it is the storage medium which can be read by a computer irrespective of the reading method such as electronic, magnetic, and optical methods.

What is claimed is:

1. An output system having an output device that performs output based on output data so that the output device performs the output after having acquired authentication comprising:
   an output data acquiring unit for acquiring the output data;
   an output data storing unit for storing the output data acquired by the output data acquiring unit in an output data memory unit;
   an authentication information acquiring unit for acquiring authentication information;
   a usage-qualification determining unit for determining a usage qualification of the output data based on the authentication information acquired by the authentication information acquiring unit;
   an operating state controlling unit for controlling a state of the output device;
   an output process completion detecting unit for detecting completion of an output process in the output device; and
   a power-save switching unit for switching a state of the output device into either one of an active state in which the output process to be performed by an output processing unit is enabled and a power-saving state in which a drive power during a stand-by time for the output process based on a command from the operating state controlling unit,
   wherein the operating state controlling unit outputs a power-save-cancel command for causing the power-saving state to be changed into the active state to the power-save switching unit after the device having the output data storing unit acquires the output data.

2. A printing system having a printing device that executes a printing process based on a printing job so that the printing device performs the printing process after having acquired authentication comprising:
   a printing job acquiring unit for acquiring the printing job;
   a printing job storing unit for storing the printing job acquired by the printing job acquiring unit in a printing job memory unit;
   an authentication information acquiring unit for acquiring authentication information;
   a usage-qualification determining unit for determining a usage qualification of the printing job based on the authentication information acquired by the authentication information acquiring unit;
   an operating state controlling unit for controlling a state of the printing device;
   a printing process completion detecting unit for detecting completion of the printing process in the printing device; and
   a power-save switching unit for switching a state of the printing device into either one of an active state in which the output process to be performed by a print processing unit is enabled and a power-saving state in which a drive power during a stand-by time for the printing process based on a command from the operating state controlling unit,
   wherein the operating state controlling unit outputs a power-save-cancel command for causing the power-saving state to be changed into the active state to the power-save switching unit after the device having the printing job storing unit acquires the printing job.

3. The printing system according to claim 2, wherein a print instruction issuing device that issues a print instruction for the printing job is connected to the printing device having the printing job storing unit so as to be capable of communicating data,
   the print instruction issuing device includes a print instruction issuing unit for transmitting the printing job to the printing job storing unit corresponding to the destination printing device of the printing job; and
   a switching-time-change instruction issuing unit for issuing instruction to change the switching time which is preset in the printing device;

the printing device includes a switching time changing unit for changing the switching time which is preset in the printing device based on a switching-time-change command from the operating state controlling unit, the operating state controlling unit is adapted to output the switching-time-change command to the switching time changing unit according to the instruction from the switching-time-change instruction issuing unit, and to output the switching-time-change command for restoring the switching time which is currently set in the destination printing device into the switching time before being changed to the switching time changing unit when the printing process completion detecting unit detects that the printing process of the printing job corresponding to the printing device whose switching time is changed is completed, or when the switching time after the change is elapsed.

4. The printing system according to claim 2, wherein a printing device management device that manages the printing device is connected to the printing device so as to be capable of data communication, the printing device management device includes the printing job acquiring unit, the printing job storing unit, the authentication information acquiring unit, the usage-qualification determining unit, the operating state controlling unit, the printing process completion detecting unit, and a printing job transmitting unit for transmitting the printing job that is determined to have the usage qualification by the usage-qualification determining unit out of the printing jobs stored in the printing job memory unit to the printing device, and the printing device includes a printing job receiving unit for receiving the printing job and the print processing unit for executing the printing process based on the printing job received by the printing job receiving unit.

5. The printing system according to claim 2, wherein the printing device includes the printing data acquiring unit, the printing job storing unit, the authentication information acquiring unit, the usage-qualification determining unit, the operating state controlling unit, and the printing process completion detecting unit.

6. The printing system according to claim 3, further comprising:

a set time information acquiring unit for acquiring the set time information as the information on the switching time preset in the destination printing device of the printing job after the device having the printing job storing unit acquires the printing job;

a term-of-validity calculating unit for acquiring the time information after the device having the printing job storing unit acquires the printing job and calculating the term of validity of the active state for the printing job based on the acquired time information and the set time information acquired by the set time information acquiring unit; and an elapse observing unit for obtaining the current time information and observing whether or not the current time passes over the term of validity based on the time information and the term of validity calculated by the term-of-validity calculating unit, wherein the operating state controlling unit is adapted to issue the transition-to-power-save command for causing the state to be changed from the active state to a power-saving state to the power-save switching unit when the printing process of the printing job is completed or when the term of validity of the printing job is expired based on the detection result of the printing process completion detecting unit and the observed result of the elapse observing unit, and to issue the switching-time-change command for causing the switching time which is currently set in the destination printing device of the printing job to be changed into the switching time indicated by the set time information corresponding to the printing job to the switching time changing unit.

7. The printing system according to claim 6, further comprising: a term-of-validity updating unit for updating the term of validity based on the switching-time-changed by the switching time changing unit, wherein the operating state controlling unit is adapted in such a manner that in a case in which the printing job memory unit has a plurality of printing jobs within the term of validity for the identical printing device stored therein, when the printing process of any one of the plurality of stored printing jobs is completed or when the term of validity of any one of the printing job is expired based on the detected result of the printing process completion detecting unit and the observed result of the elapse observing unit, the set time information corresponding to the printing job whose term of validity will expire next is changed into the set time information corresponding to the printing job whose printing process is completed or whose term of validity is expired, and that the transition-to-power-save command for causing the state to be changed from the active state to the power-saving state is issued to the power-save switching unit and the switching-time-change command for causing the switching time which is currently set in the printing device to be changed into the set time information corresponding to the printing job whose printing process is completed last or the printing job whose term of validity is expired last is issued to the switching time changing unit when there is no more printing job within the term of validity left among the plurality of stored printing job.

8. The printing system according to claim 3, wherein the upper limit of the switching time to be set is within a range of 15 to 30 minutes.

9. A printing device management device that manages a printing device for executing a printing process based on a printing job, comprising:

a printing job acquiring unit for acquiring the printing job;

a printing job storing unit for storing the printing job acquired by the printing job acquiring unit in a printing job memory unit;

an authentication information acquiring unit for acquiring authentication information;

a usage-qualification determining unit for determining a usage qualification of the printing job based on the authentication information acquired by the authentication information acquiring unit;

an operating state controlling unit for controlling a state of the printing device;

a printing process completion detecting unit for detecting completion of the printing process in the printing device;

and a printing job transmitting unit for transmitting the printing job which is determined to have the usage qualification by the usage-qualification determining unit out of the printing jobs stored in the printing job memory unit to the printing device, wherein the operating state controlling unit transmits a power-save-cancel command for causing a power-saving state to be changed to an active state to the printing device after having acquired the printing job.

* * * * *